United States Patent
Kuang et al.

(10) Patent No.: US 12,114,368 B2
(45) Date of Patent: *Oct. 8, 2024

(54) TRANSMISSION OF CONTROL INFORMATION

(71) Applicant: Panasonic Intellectual Property Corporation of America, Torrance, CA (US)

(72) Inventors: Quan Kuang, Frankfurt (DE); Hidetoshi Suzuki, Kanagawa (JP); Ayako Horiuchi, Kanagawa (JP); Lilei Wang, Beijing (CN); Alexander Golitschek Edler Von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,697

(22) Filed: Jun. 29, 2023

(65) Prior Publication Data

US 2023/0345548 A1 Oct. 26, 2023

Related U.S. Application Data

(63) Continuation of application No. 17/513,574, filed on Oct. 28, 2021, now Pat. No. 11,737,147, which is a
(Continued)

(51) Int. Cl.
*H04W 74/0833* (2024.01)
*H04L 5/00* (2006.01)
*H04W 8/22* (2009.01)

(52) U.S. Cl.
CPC ....... *H04W 74/0833* (2013.01); *H04L 5/0053* (2013.01); *H04W 8/22* (2013.01)

(58) Field of Classification Search
CPC .... H04W 74/0833; H04W 8/22; H04L 5/0053
See application file for complete search history.

(56) References Cited

U.S. PATENT DOCUMENTS 11,191,105 B2 * 11/2021 Kuang .................. H04L 5/0053
11,457,410 B2 * 9/2022 Huang .................. H04W 72/20
(Continued)

FOREIGN PATENT DOCUMENTS

| CN | 102740485 A | 10/2012 |
| EP | 2725866 A1 | 4/2014 |

(Continued)

OTHER PUBLICATIONS

3GPP TR 38.913 V14.0.0, "3rd Generation Partnership Project; Technical Specification Group Radio Access Network; Study on Scenarios and Requirements for Next Generation Access Technologies; (Release 14)," Oct. 2016, 39 pages.
(Continued)

*Primary Examiner* — Jaison Joseph
(74) *Attorney, Agent, or Firm* — Seed IP Law Group LLP

(57) ABSTRACT

The present disclosure includes as one aspect a device comprising: a receiver capable of receiving control signal from a base station in a first set of control resources and in a second set of control resources, a transmitter capable of transmitting control signals and data, a circuitry which, when in operation, controls: the transmitter to transmit a random access message associated with the first set of control resources and to transmit communication device capability indication; the receiver to monitor control resources in the first set of control resources after transmitting the random access message and to receive within the first set of control resources configuration of the second set of control resources; the receiver to monitor control resources in the first set of control resources and/or in the
(Continued)

second set of control resources after receiving the configuration of the second set of control resources.

20 Claims, 10 Drawing Sheets

Related U.S. Application Data continuation of application No. 16/474,236, filed as application No. PCT/CN2017/070380 on Jan. 6, 2017, now Pat. No. 11,191,105.

(56) References Cited

U.S. PATENT DOCUMENTS

| | | | | |
|---|---|---|---|---|
| 11,737,147 | B2* | 8/2023 | Kuang | H04W 8/22 375/141 |
| 2002/0071480 | A1 | 6/2002 | Marjelund et al. | |
| 2012/0087333 | A1 | 4/2012 | Huang et al. | |
| 2014/0036747 | A1* | 2/2014 | Nory | H04W 72/20 370/336 |
| 2014/0254452 | A1* | 9/2014 | Golitschek Edler Von Elbwart | H04W 52/0219 370/311 |
| 2015/0365968 | A1* | 12/2015 | Kim | H04L 5/14 370/280 |
| 2016/0095118 | A1 | 3/2016 | Mizusawa | |
| 2016/0302203 | A1* | 10/2016 | Liu | H04L 5/0098 |
| 2018/0132243 | A1* | 5/2018 | Yang | H04L 5/0092 |
| 2018/0184410 | A1* | 6/2018 | John Wilson | H04W 72/20 |
| 2018/0309560 | A1* | 10/2018 | Tang | H04L 5/0053 |
| 2018/0316464 | A1* | 11/2018 | Stern-Berkowitz | H04L 1/1692 |
| 2019/0149257 | A1* | 5/2019 | Jiang | H04L 27/26025 370/342 |
| 2019/0149984 | A1* | 5/2019 | Takeda | H04L 1/1864 370/328 |
| 2019/0215828 | A1* | 7/2019 | Kim | H04W 72/04 |
| 2023/0345548 | A1* | 10/2023 | Kuang | H04W 8/22 |

FOREIGN PATENT DOCUMENTS

| | | |
|---|---|---|
| GB | 2522665 A | 8/2015 |
| RU | 2 518 176 C2 | 6/2014 |

OTHER PUBLICATIONS

European Official Communication, dated Dec. 3, 2021, for European Application No. 17 889 805.2-1215. (9 pages).
Extended European Search Report, dated Jul. 15, 2020, for European Application No. 17889805.2, 8 pages.
International Search Report, mailed Oct. 11, 2017, for corresponding International Application No. PCT/CN2017/070380, 2 pages.
Japanese Office Action, dated Oct. 27, 2020, for Japanese Application No. 2019-527244, 21 pages. (with English machine translation).
MediaTek Inc., "DL Control Channel Design for NR," R1-1612120, Agenda Item: 7.1.1, 3GPP TSG RAN WG1 Meeting #87, Reno, USA, Nov. 14-18, 2016, 4 pages.
NTT Docomo, "Discussion on multiple-step DCI for NR," R1-1612717, Agenda Item: 7.1.4.1, 3GPP TSG RAN WG1 Meeting #87, Reno, USA, Nov. 14-18, 2016, 3 pages.
Panasonic, "Use of multiple numerologies in NR," R1-167439, Agenda Item: 8.1.3.1, 3GPP TSG RAN WG1 Meeting #86, Gothenburg, Sweden, Aug. 22-26, 2016, 9 pages.
Russian Office Action dated May 20, 2020, for the corresponding Russian Patent Application No. 2019120846, 10 pages. (With English Translation).
Russian Search Report dated Apr. 30, 2020, for the corresponding Russian Patent Application No. 2019120846, 4 pages. (With English Translation).
Samsung, "RACH procedure considering flexible UE bandwidth," R1-1612469, Agenda item: 7.1.2.5, 3GPP TSG RAN WG1 Meeting #87, Reno, USA, Nov. 14-18, 2016, 3 pages.
Korean Office Action dated Mar. 14, 2024, for the corresponding Korean Patent Application No. 10-2019-7019403, 17 pages. (With English Translation).
Lenovo, "Design of M-PDCCH for Rel-13 MTC UEs," R1-154500, Agenda Item: 7.2.1.2, 3GPP TSG RAN WG1 Meeting #82, Beijing, China, Aug. 24-28, 2015, 5 Pages.

* cited by examiner

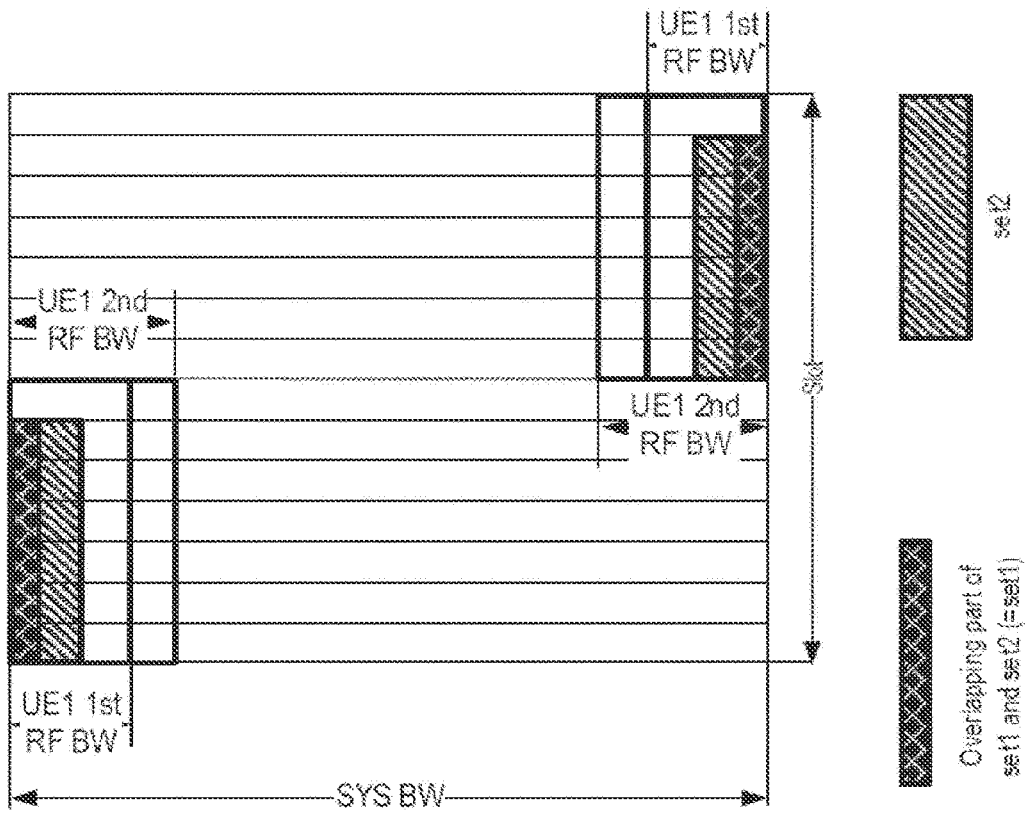
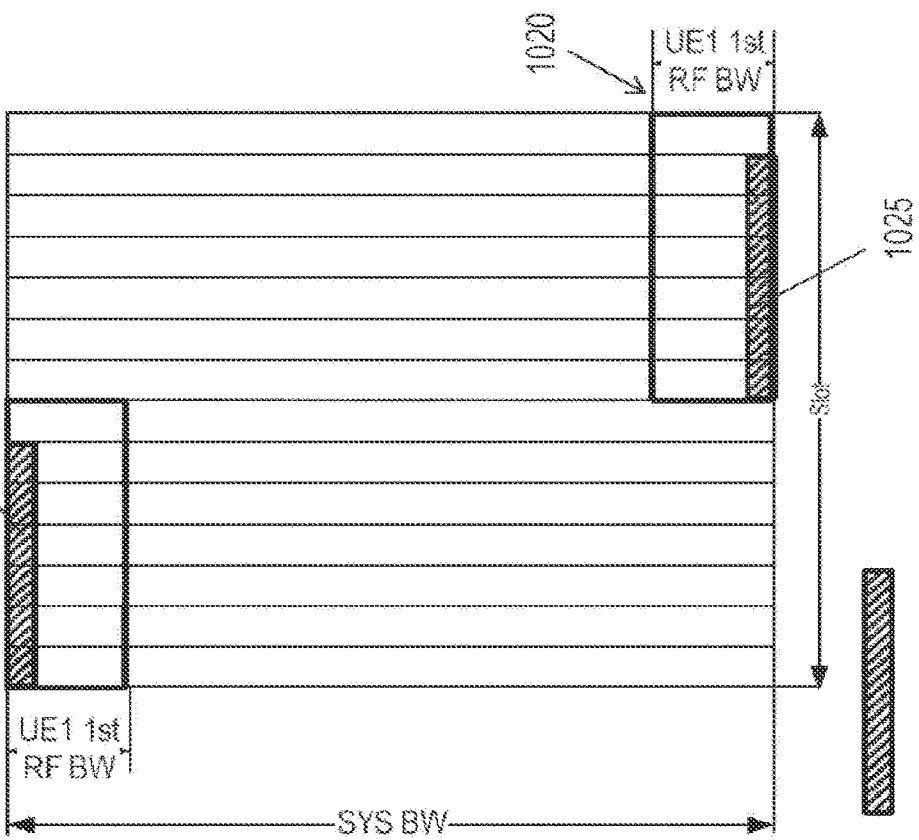

TRANSMISSION OF CONTROL INFORMATION

BACKGROUND

1. Technical Field

The present disclosure relates to configuration of a control resource set in a network with mixed numerologies and capabilities of communication devices as well as to the corresponding methods and apparatuses.

2. Description of the Related Art

Currently, the 3$^{rd}$ Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard.

The aim of the study item is to develop a "New Radio (NR)" access technology which operates in frequency ranging up to 100 GHz and supports a broad range of use cases, as defined during the RAN requirements study (see, e.g., 3GPP TR 38.913 "Study on Scenarios and Requirements for Next Generation Access Technologies", current version 14.0.0 available at www.3gpp.org and incorporated herein its entirety by reference). One objective is to provide a single technical framework addressing all usage scenarios, requirements and deployment scenarios defined in TR 38.913, at least including enhanced mobile broadband (eMBB), ultra-reliable low-latency communications (URLLC), and massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; whereas mMTC may include the scenarios with large number of devices with non-time critical data transfers such as smart wearables and sensor networks.

The second objective is the forward compatibility. The backward compatibility to the Long Term Evolution (LTE) is not required, which facilitates a completely new system design and/or the introduction of novel features.

The fundamental physical layer signal waveform will be based on the Orthogonal Frequency Division Multiplexing (OFDM), with possible support of a non-orthogonal waveform and multiple access. For instance, additional functionality on top of the OFDM are considered, such as Discrete Fourier Transformation (DFT) spread OFDM (DFT-S-OFDM), and/or variants of the DFT-S-OFDM, and/or filtering/windowing. In LTE, Cyclic Prefix (CP) based OFDM and DFT-S-OFDM are used as waveforms for downlink and uplink transmissions, respectively. One of the design targets in NR is to seek the common waveform as much as possible for downlink, uplink and sidelink. It has been considered that introduction of the DFT spreading might not be needed for some cases of uplink transmission. The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

Besides the waveform, some basic frame structure(s) and channel coding scheme(s) are being developed to achieve the above-mentioned objectives. As identified in TR 38.913, the various use cases/deployment scenarios for NR have diverse requirements in terms of data rates, latency, and coverage. For example, eMBB is expected to support peak data rates (20 Gbps for downlink and 10 Gbps for uplink) and user-experienced data rates in the order of three times what is offered by International Mobile Telecommunications-Advanced (IMT-Advanced). On the other hand, in case of URLLC, the tighter requirements are put on ultra-low latency (0.5 ms for UL and DL each for user plane latency) and high reliability. Finally, mMTC requires high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, CP duration), and number of symbols per scheduling interval that are suitable for one use case might not work well for another. For example, low-latency applications may require a shorter OFDM symbol duration (larger subcarrier spacing) and/or fewer symbols per scheduling interval (also referred to as Transmission Time Interval, TTI) than an mMTC application. Furthermore, deployment scenarios with large channel delay spreads require a longer CP duration than scenarios with short delay spreads. The subcarrier spacing should be optimized accordingly to retain the similar CP overhead.

In 3GPP RAN1 #84bis meeting (Busan, April 2016), it was agreed that it is necessary for NR to support more than one value of subcarrier spacing. The values of subcarrier spacing are derived from a particular value of subcarrier spacing multiplied by N where N is an integer scaling factor. In 3GPP RAN1 #85 meeting (Nanjing, May 2016), it was concluded as a working assumption that the LTE-based numerology including 15 kHz subcarrier spacing is the baseline design for the NR numerology. For the scaling factor N, it was concluded that N=2n (where n is an integer, such as 0, 1, 2, −1, −2, . . . ) as the baseline design assumption. Correspondingly, subcarrier spacing of 15 kHz, 30 kHz, 60 kHz, etc., are being considered.

FIG. 1 illustrates three different subcarrier spacing settings (15 kHz, 30 kHz, and 60 kHz) and the corresponding symbol duration. The symbol duration Tu and the subcarrier spacing Δf are directly related through the formula Δf=1/Tu. In a similar manner as in the LTE systems, the term "resource element" can be used to denote a minimum resource unit being composed of one subcarrier for the length of one OFDM or Single-Carrier (SC) Frequency Division Multiple Access (SC-FDMA, used in LTE uplink and possibly also to be used in NR in uplink) symbol.

In order to support the multiplexing of different services with diverse requirements, it has been agreed in 3GPP RAN1 #85 meeting that NR supports the multiplexing of different numerologies within the same NR carrier bandwidth (from the network perspective). On the other hand, from a UE perspective, a UE may support one or more than one usage scenarios (e.g., an eMBB UE or a UE supporting both eMBB and URLLC). However, supporting more than one numerologies can complicate UE processing.

It has been also recognized that NR should support flexible network and User Equipment (UE) channel bandwidth due to several reasons: Firstly, NR is expected to support operation in a very wide range of spectrum, ranging from sub-GHz up to tens of GHz with very different configurations regarding the available spectrum and, hence possible transmission bandwidth. Secondly, many frequency bands to be used for NR are not yet fully identified, implying that the size of the spectrum allocations is not yet known. Thirdly, NR is expected to support a wide range of applications and use cases, with some of them requiring very wide UE transmission/reception bandwidth and others requiring very low UE complexity which implies much lower UE transmission/reception bandwidth. Therefore, it was agreed in 3GPP RAN1 #85 meeting that NR physical-layer design should be such that devices with different bandwidth capabilities can efficiently access the same NR carrier regardless of the NR carrier bandwidth.

BRIEF SUMMARY

One non-limiting and exemplary embodiment facilitates providing of efficient control resource set(s) for systems with mixed numerologies.

In one general aspect, the techniques disclosed here feature a communication device comprising: a receiver capable of receiving control signal from a base station in a first set of control resources and in a second set of control resources, a transmitter capable of transmitting control signals and data, a circuitry which, when in operation, controls: the transmitter to transmit a random access message associated with the first set of control resources and to transmit communication device capability indication; the receiver to monitor control resources in the first set of control resources after transmitting the random access message and to receive within the first set of control resources configuration of the second set of control resources; the receiver to monitor control resources in the first set of control resources and/or in the second set of control resources after receiving the configuration of the second set of control resources.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 4 is a flow diagram showing an exemplary procedure performed by a communication device to obtain a first and a second control resource sets after power-on;

FIG. 10 is a schematic drawing illustrating frequency hopping for a first control resource set;

FIG. 11 is a schematic drawing illustrating frequency hopping for a first control resource set as well as for the second control resource set;

DETAILED DESCRIPTION

Figure 2:
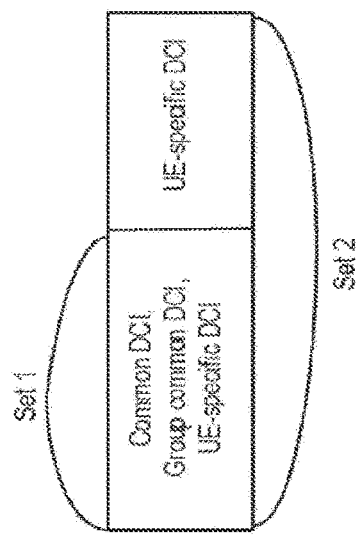
FIG. 2 is a schematic drawing illustrating an example of configuration of two control resource sets.

A "mobile station" or "mobile node" or "user terminal" or "user equipment (UE)" or "communication device" is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" here refers to a physical entity within a communication network. The physical entity performs some control tasks with respect to the communication device, including one or more of scheduling and configuration. It is notes that the base station functionality and the communication device functionality may be also integrated within a single device. For instance, a mobile terminal may implement also functionality of a base station for other terminals.

The term "radio resources" or "resources" as used in the set of claims and in the application is to be broadly understood as referring to physical radio resources, such as physical time-frequency radio resources.

The term "numerology scheme" (and other similar terms such as "OFDM numerology") as used herein is to be broadly understood as referring to how the physical time-frequency radio resources are handled in the mobile communication system, particularly how these resources are partitioned into resource scheduling units to be allocated by a scheduler (e.g., in the radio base station). Put differently, a numerology scheme can also be considered as being defined by the parameters used to partition the above-mentioned physical time-frequency radio resources into resource scheduling units, such as the subcarrier spacing and corresponding symbol duration, the TTI length, the number of subcarriers and symbols per resource scheduling unit, the cyclic prefix length, etc.; these parameters may be called L1 (Layer 1) parameters, since they are mainly used in the physical layer to perform the uplink transmission and to receive downlink transmissions.

The term "resource scheduling unit" shall be understood as a group of physical time-frequency radio resources being the minimum unit that can be allocated by a scheduler. A resource scheduling unit thus comprises time-frequency radio resources, composed of one or more contiguous subcarriers for the duration of one or more symbols, according to the particular characteristics of the numerology scheme.

The term "data transmission usage scenario" or simply "usage scenario" or "use case" as used in the set of claims and in the application may be understood broadly as a range of use cases for mobile/stationary terminals. Exemplarily, a usage scenario as studied for the new 5G study item can be, e.g., the eMBB, mMTC, or URLLC as introduced in the background section.

The term "control resources" refers to resources for carrying control information rather than user data (payload). The control information may include but is not limited to resource allocation for downlink, uplink or sidelink.

The present disclosure provides a configuration of control resource set in a network with mixed numerologies (such as OFDM numerologies) and UE capabilities.

One example of a system to which the present disclosure is applicable may be the NR. For instance, the eMBB, URLLC and mMTC could have different OFDM numerologies. For example, URLLC could use large subcarrier spacing such as larger than 15 kHz, and short scheduling interval to achieve low latency of, e.g., smaller than or equal to 0.5 ms. On the other hand, eMBB could use large subcarrier spacing and long scheduling interval to reduce control overhead, whereas the latency requirement is somewhat relaxed, e.g., up to 4 ms. Moreover, mMTC is assumed to require small carrier spacing (e.g., equal to or lower than 15 kHz) for massive number of connections within narrow bandwidth and large coverage. These and possibly further use cases may employ the control resource set configuration as disclosed herein.

In order to provide devices with different bandwidth capabilities an efficient access NR carrier regardless of the actual NR carrier bandwidth, control channels should not span the full system bandwidth in all use cases as it is for regular UEs in the LTE system. In particular, in legacy LTE, Physical Downlink Control Channel (PDCCH) is used by base station (called eNB) to transmit Downlink Control Information (DCI) to regular UEs. The DCI includes downlink scheduling assignment, uplink scheduling grants, and uplink power control information as well as further configuration parameters. In frequency domain, PDCCH is mapped into resource elements that are spread over the whole system bandwidth. In time domain, the number of symbols occupied by PDCCH is indicated by the Physical Control Format Indicator Channel (PCFICH).

In general, in the NR there may be also a similar mechanism for transmitting control information from a base station to a communication device (i.e., a downlink control information). The control information may be used, in particular, for scheduling resource which may be further used for control information or payload. For instance, a base station transmits DCIs in a control resource set which has to be monitored by the communication device. Here, the term "monitoring" refers to receiving, by the communication device, the signal carried in the control resource set and determine whether or not the control information is addressed to the communication device (exclusively or to a group of which the communication device is a member). Such monitoring may include, similarly as in LTE, performing a blind detection. In other words, the communication device detects and decodes signal in a control resource by using own identity of the communication device. The identity may be used to scramble CRC or in another way. The blind detection may also be attempted with various group identities in order to monitor (group) common DCIs. If the monitoring reveals a DCI addressed to the communication device, the communication device decodes the DCI and uses the information received therein (such as resource grant/allocation) to access resources allocated as signaled in the DCI. In legacy LTE, the DCI can be addressed to a group of UEs. Such DCI is referred to as a group or common DCI. On the other hand, a DCI may also be addressed to an individual UE and is then referred to as a UE-specific DCI. The PDCCHs that carry different DCIs for different UEs/groups are distinguished by the Radio Network Temporary Identifier (RNTI) embedded in the Cyclic Redundancy Check (CRC). For example, for normal unicast data transmission, a UE-specific C-RNTI (cell RNTI) is used. After checking the CRC of the PDCCH with its own C-RNTI, the UE can decide whether or not the PDCCH is addressed to itself. In terms of (group) common DCI, other types of common RNTI are used, such as SI-RNTI, P-RNTI, RA-RNTI, and TPC-PUCCH/PUSCH-RNTI for system information, paging, random access response, and PUCCH/PUSCH uplink power control command, respectively.

In addition to the PDCCH, regular UEs in legacy LTE may be configured to monitor Enhanced PDCCH (EPDCCH) which spans a subset of system bandwidth. However, the configuration of EPDCCH is typically provided to a UE via Radio Resource Control (RRC) signaling the transmission of which is scheduled by the PDCCH. Therefore, a UE that is monitoring an EPDCCH is typically able to receive the PDCCH. Generally speaking, regular UEs in LTE are required to have full system bandwidth capability in order to receive control information even if EPDCCH is employed.

In NR, UE's bandwidth capability is typically smaller than the system bandwidth, considering the fact that system is aiming to enable very wide bandwidth operation and UEs with diverse services accommodated within the same network. As a result, the control channel which spans the whole system bandwidth does not facilitate an efficient system design, at least for the common DCIs. In order to facilitate a more efficient system design, in the present disclosure, the (group) common control channel is transmitted with restricted bandwidth such that all UEs (inside the group) with different capabilities can decode it. Thus, no duplicated messages need to be transmitted to each individual UE matching its capability, which would increase the signaling overhead dramatically.

On the other hand, even if an NR UE is able to support the full system bandwidth, it may not need to operate on the full bandwidth capability all the time. Larger operating radio frequency (RF) bandwidth means larger power consumption for the UE. If the control channels are transmitted with a subset of system bandwidth, UE's monitoring efforts can be reduced. This may further enable reduction of the UE power consumption.

Accordingly, a control subband or a control resource set may be defined which is to be monitored by all UEs. A control resource set is a set of time-frequency resources within which a UE attempts to blindly decode the DCI (or, generally, control information). The control resource set is advantageously defined on a control subband narrower than the system bandwidth. In the present disclosure, examples of control resource set configurations are provided, which may be beneficial for the NR where multiple numerologies coexist in the system and UEs have diverse bandwidth capabilities. In order to facilitate an efficient system design, it is thus desirable to obtain at least one search space (control resource set to be monitored) from the system information (e.g., via cell broadcast) or to implicitly derive it from the initial access information. This at least one search space may then be used by the UE to receive control messages enabling the UE to receive higher layer signaling (such as RRC) with configuration of additional search spaces (control resource sets which may be monitored).

One issue of having an NR carrier which supports multiplexing of different numerologies is that a single configuration of control resource set for a case of one numerology may not work well for another. Moreover, there is the general design aim of maintaining low signaling overhead and UE power consumption. When the number of control resource sets allocated to a UE increases, the amount of signaling relating to control information increases, too. This may also lead to congestion when the network is serving too many UEs and where many UEs share the same control resource set. Moreover, the UE's monitoring efforts may also increase if multiple control resource sets are configured for a UE, which could lead to an increase of the power consumption of UE.

Furthermore, it is to be considered, how the configuration of control resource set can enable the frequency diversity for UEs with various bandwidth capabilities. Frequency diversity is very important to achieve reliable transmission of control information. The configuration of control resource sets should support the frequency diversity. However, in an NR carrier where UEs with different (bandwidth) capabilities are accommodated, a single configuration for control resource set does not work well.

According to an embodiment, there are thus two control resource sets for a UE:
a first control resource set (set 1) obtained by the UE from a random access procedure; and
a second control resource set (set 2) configured by the base station after obtaining UE capability indication.

Each set is associated with a RF bandwidth: Set 1 implicitly indicates the first RF bandwidth (BW), and the second RF BW is configured by the base station alongside with set 2. The first and second RF bandwidths are bandwidths in which any resources are located which can be allocated by the control messages carried in the respective first and second control resource set. In other words, the first and second RF bandwidth are operating bandwidths of the UE. Nevertheless, these RF BWs are recommendation from the scheduler (e.g., base-station) point of view, implying that the resources scheduled by DCI will be limited inside these RF BWs. UE can set its RF operating BW according to this recommendation or in another manner, different from the recommendation as long as the DCI and the corresponding data transmission can be received.

One reason that a UE is configured with more than one control resource sets is for the power saving purpose. The RF BWs associated with different control resource sets may be different. Then the UE's operating RF bandwidth can be set wisely. As a consequence, when the UE is idle or inactive, it can be instructed to monitor the control resource set (e.g., set 1) with the associated smaller RF operating bandwidth to save the power consumption. When the UE is not inactive, it can be instructed to monitor the control resource set (e.g., set 2) with the associated larger RF operating bandwidth to enable larger allocations and thus higher data rates.

The base station may be a gNB, which is a name currently used in 3GPP to refer to an NR base station. However, the present disclosure is not limited to NR and consequently to gNB either. Any other communication system may employ the configurations disclosed herein.

The first control resource set may be a subset of the second control resource set in frequency domain. In other words, the bandwidth of the first set of control resources is included in the bandwidth of the second set of control resources. In addition, the first control resource set may be a subset of the second control resource set in the time domain. In other words, the number of (OFDM) symbols of the first set of control resources may be smaller than or equal to the number of symbols of the second set of control resources. Accordingly, the first control resource set continues being in use by the UE even after configuring the second control resource set. However, it is noted that the present disclosure is not limited to this example. It may be advantageous in some scenarios or systems, if the UE after obtaining the second control resource set ceases to monitor the first resource set.

As described above, the frequency range (bandwidth) of the first control resource set may be narrower than the frequency range (bandwidth) of the second control resource set to enabling UEs with different capabilities accessing the first control resource set, reducing the UE power consumption and the like. In particular, the frequency range of the first control resource set may be overlapping or completely included in the bandwidth of the second control resource set.

According to an exemplary configuration, the control information common to two or more UEs is only carried by the overlapping part of set 1 and set 2. In other words, the group common search space (CSS) is only carried in the resources which are included in both the first control resource set and the second control resource set. On the other hand, the user specific search space (USS) may be carried by the remaining portions of the second control resource set. This exemplary configuration is illustrated in FIG. 2. The terms UE-specific/group/common "search space" denotes a subset of control resources carrying specific/group/common control information to be monitored by blind decoding.

In particular, FIG. 2 illustrates an example of the relations between control resource set and the control information (DCI) type carried therein. Set 1 carries common control information to be read by all UEs, possibly a group control information to be read by a specific group of UEs and a UE-specific control information addressed only to a specific UE. The portion of set 2 which does not overlap with set 1 carries only UE-specific control information and no common/group control information. Set 1 is a part of Set 2. When a UE is instructed to monitor only set 2 for UE-specific DCI, there are more resources for the DCI transmission (compared to FIG. 3 case), resulting in a potentially larger diversity gain.

Figure 3:
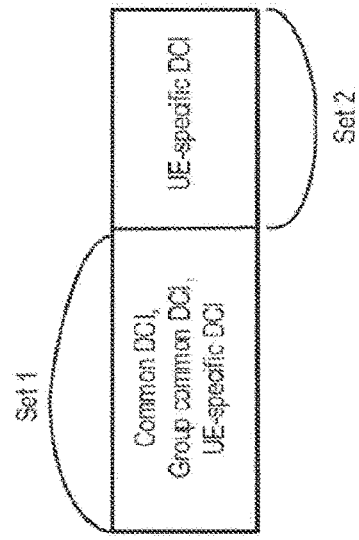
FIG. 3 is a schematic drawing illustrating an example of configuration of two control resource sets.

FIG. 3 illustrates another example of the relations between control resource set and the DCI. In particular, it shows another exemplary configuration of set 1 and set 2. In this configuration, similarly to the configuration of FIG. 2, set 1 carries a common control information, a group common control information and a UE-specific control information, whereas set 2 carries only UE-specific but no common/group control information. Set 1 and set 2 in this example are disjoint (mutually exclusive). When a UE is instructed to monitor only set 2 for a UE-specific DCI, the monitoring effort is also reduced.

It is noted that the examples described with reference to FIGS. 2 and 3 are only exemplary and that in general, set 1 and set 2 may be composed of resources which overlap. Moreover, in the above examples, all common search spaces including the common search space relevant for all communication devices and group search spaces are carried in set 1. However, the present disclosure is not limited to such configurations. In particular, one or more group search spaces may also be carried in set 2.

In LTE, UE has two different RRC states: RRC_idle and RRC_connected.

In idle state, no data transfer may take place as UE sleeps most of the time to save power. UE periodically wakes up in order to receive, e.g., paging messages. In connected state, there is an RRC context established—that is, the parameters necessary for communication between the UE and the radio-access network are known to both entities. Connected state is intended for data transfer to/from the terminal.

In NR, the design of these two states are likely to remain, although the necessity of introducing additional new state, e.g., inactive state is being discussed, to provide better trade-off between UE power saving and the wake-up time. Currently, the behavior of the new state is to yet be defined.

In general, it is expected that the signaling traffic during idle and inactive states is lower than in the connected states. Accordingly, in some exemplary operations, a communication device may be configured to monitor only set 1 in the idle or inactive state and to monitor set 2 and/or set 1 otherwise, e.g., in the connected state. Moreover, if the communication device is in the connected state, it may be configured to monitor only set 1 if the traffic is low (e.g., below certain threshold) and to monitor set 2 in addition or alternatively to set 1 if the traffic exceeds certain threshold. Therefore, the "power-saving" modes can include RRC_idle, RRC_connected or potentially new states.

Figure 4:
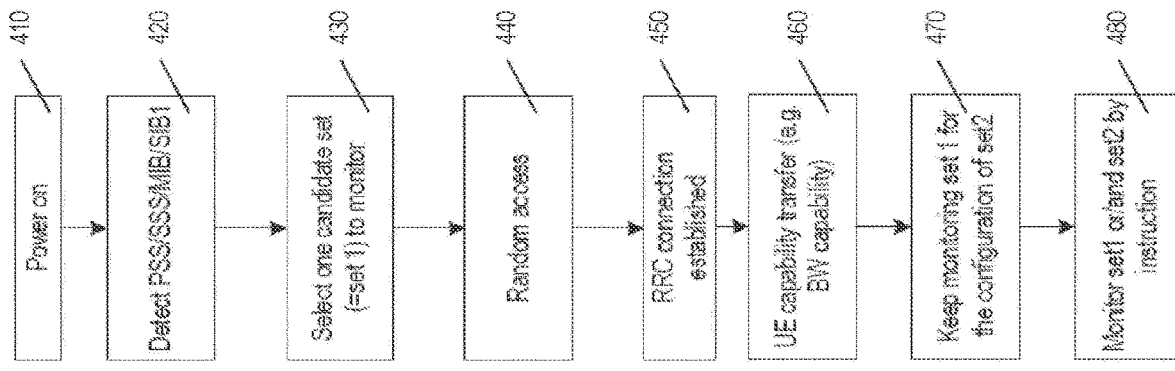

FIG. 4 illustrates an overview of an exemplary UE procedure to obtain the configuration of control resource sets 1 and 2 after power up. In particular, in step 410 the communication device (UE) is switched on.

In the 420 the communication device performs synchronization tasks and reads system information. In particular, step 420 may include actions similar to those performed by a UE after power on in the LTE system. Such actions may comprise detecting the primary synchronization sequence (PSS) and a secondary synchronization sequence (SSS) and performing frame and symbol synchronization accordingly.

Furthermore, after synchronizing, the communication device may read system information broadcast by the base station. In LTE the system information includes especially the master information block (MIB) and further system information blocks (SIB s). The master information block consists of a limited number of the most frequently transmitted parameters necessary for performing initial access to the cell. Although the detailed parameters in MIB for NR are still under discussion, they may be similarly designed as in LTE, i.e., reused to some extent. The first SIB, e.g., SIB1, may then comprise a list of candidates for the first control resource set, each candidate being associated with a particular set of the random access channel resources (In LTE Physical Random Access Channel, PRACH). An association between each candidate set and a unique set of random access channel resources provides the advantage that based on the random access channel resource the base station is in the position to identify the first control resource set in which the base station then transmits control information to the particular communication device. Moreover, each candidate may be associated with further parameters such as numerology, operation bandwidth (first bandwidth), frequency location or the like.

The numerology and time-frequency resources for transmitting PSS/SSS/MIB could be defined in the standard such that all UEs can decode this information. The numerology for transmitting a further SIB (e.g., SIB1) to be read in order to perform random access can be the same as MIB, or alternatively indicated by the MIB. The time-frequency resources for transmitting the further SIB (e.g., SIB1) is known to the UE from the MIB or alternatively defined in the standard. The reason to put set 1 configuration into the further SIB (e.g., SIB1) is to avoid significantly increasing MIB size, but still able to utilize set 1 to schedule the rest of SIBs as early as possible. However, the present disclosure is not limited to the configuration of set 1 being included in SIB 1. The set 1 configuration may be broadcast by the base station in any form or structure which enables the UE to receive and decode it. For instance, it may be included in the MIB. Moreover, NR may apply a structure different from the MIB/SIB hierarchy used in LTE.

The above description is based on LTE initial access procedure. However, the synchronization and system information obtaining procedure in NR may differ from the procedure known from the LTE. In any case, after powering on a communication device synchronizes with the base station in order to be able to read at least the system information. The system information may include for instance indication of resources on which further control (system) information is carried and/or numerology for the control (system) information. For instance, the system information may indicate the first set of control resources or point towards resources in which the indication of the first set of control resources is carried. In one exemplary implementation, the system information indicates a plurality of candidate control resource sets out of which the communication device may select one to monitor. The selection of the first control resource set out of the candidate sets is illustrated in step 430. The communication device may select one of the candidate sets also according to its supported numerology and bandwidth capability. For instance, in system information there may be different candidate sets associated with respective different numerologies and bandwidth capabilities as well as different random access channel resources. In order to start a random access procedure, the communication device transmits preamble using a pseudo-random sequence and uplink resources associated with that the selected set.

In step 440, the random access procedure is performed. The random access procedure may be also employed to notify the base station of the first control resource set selected in step 430. In particular, during the random access procedure the communication device transmits a random access message using the resources which are associated with the selected control resource set. For instance, such association may be given by associating certain control resource sets with the respective random access signatures out of which the communication device selects one to be included into the random access preamble.

In step 450, after a successful random access procedure, radio resource control (RRC) connection is established. In other words, the signaling bearer is established in order to facilitate further control information exchange between the communication device and the base station. In particular, the base station may transmit a UE specific DCI within set 1 including scheduling information for RRC signaling in downlink to configure the UE.

In step 460, the communication device notifies the base station of its capabilities. The UE capabilities may include for instance the operation bandwidth capability and/or the use case.

After informing the base station of its capabilities, the communication device continues monitoring the first control resource set for control information in step 470. In response to receiving the UE capability notification, the base station may transmit, within the first control resource set, to the communication device the configuration of the second control resource set to be monitored. For instance, the gNB decides on configuration of set 2 and the second RF bandwidth according to the UE numerology, bandwidth capability and network situation, and signals the configuration to the UE by RRC reconfiguration message scheduled by the DCI carried in the first set of control resources.

The communication device receives the configuration of the second control resource set and upon the reception, in step 480 starts monitoring the second control resource set. As explained above, in some examples, the communication device also continues monitoring the first control resource set whereas in other examples only the second control resource set is monitored.

Figure 5:
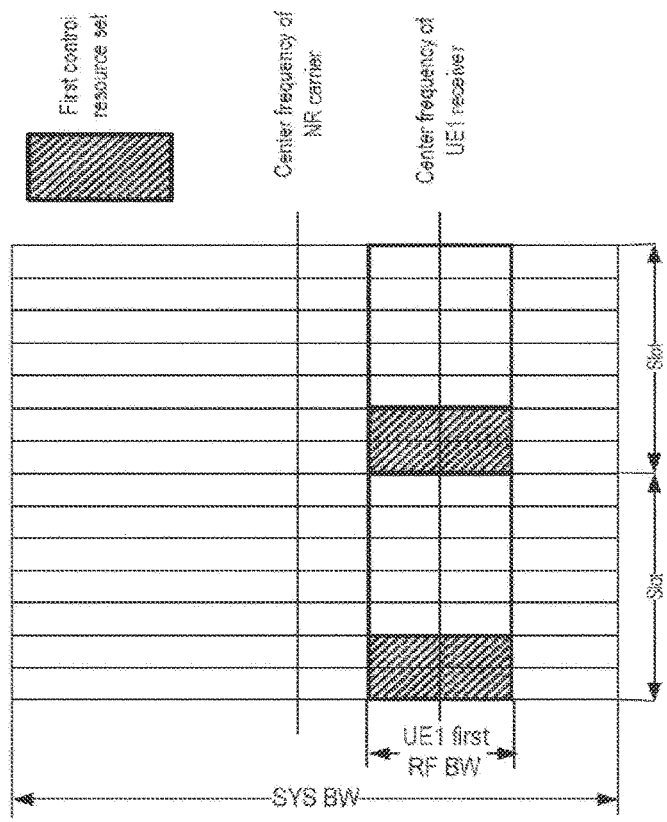
FIG. 5 is a schematic drawing showing an exemplary configuration of a first control resource set in the time-frequency resource grid.

FIG. 5 illustrates an example of 1st control resource set and 1st operating RF bandwidth (also referred to as the first bandwidth) for one UE in the network, where bandwidth of set 1 equals to the 1st UE operating RF bandwidth. In particular, FIG. 5 shows the OFDM grid with the vertical dimension given by the system bandwidth (SYS BW) extending on both sides of the center frequency of the NR carrier and the horizontal dimension given by a subframe (of 1 ms) including exemplarily two slots with each slot comprising seven OFDM symbols. Before the UE capability transfer, as explained above, set 1 is used to carry both (group) common control information and UE-specific control information. Moreover, set 1 has only control resources located within the first bandwidth (UE1 first RF BW) which is a subset of the system bandwidth. Moreover, as can be seen in FIG. 5, the first control resource set is located only in some of the OFDM symbols. In particular, in this example the first control resource set is located in first two OFDM symbols of each slot. However, the present disclosure is not limited to such configuration and in general the first control resource set may be defined on any subset of the system bandwidth and (sub)frame. It is noted that in this case, the symbols are OFDM symbols. However, the present disclosure is not limited to OFDM. Any other time-frequency system such as SC-FDMA or the like may also be used. In general, other than time-frequency resources may also be configured.

In other words, after decoding initial system information (e.g., SIB 1) necessary to perform random access, the UE selects one entry from the list of first control resource set candidates and returns its center frequency (i.e., center frequency of UE1 receiver in FIG. 5). The first RF BW of the UE can be set to minimum requirement of this list entry, i.e., the minimum bandwidth configuration associated with the selected candidate set. In other words, the entry may define a range of the RB BW to be supported out of which the UE may be configured to apply the minimum.

Figure 6:
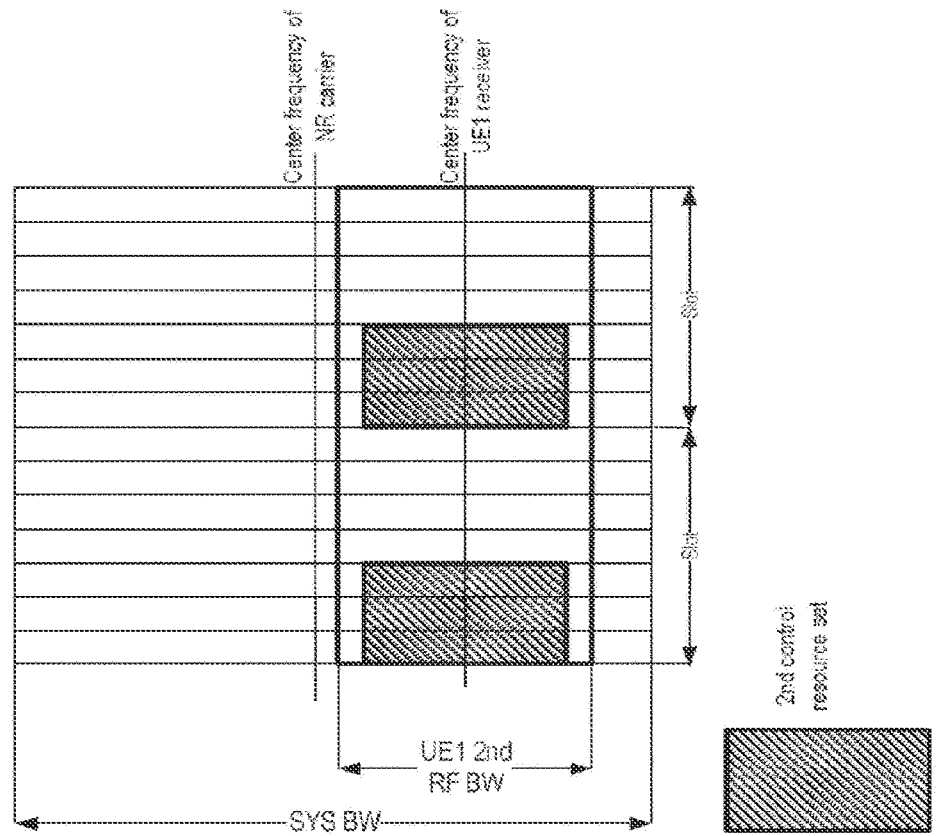
FIG. 6 is a schematic drawing showing an exemplary configuration of a second control resource set in the time-frequency resource grid.

FIG. 6 illustrates an example of the 2nd control resource set and the 2nd operating RF bandwidth for one UE in the network, where bandwidth of set 2 is smaller than the 2nd UE operating RF bandwidth. In particular, FIG. 6 shows the same OFDM resource grid illustrated in FIG. 5 and given by the system bandwidth (SYS BW) in the frequency domain and subframe consisting of two slots in the time domain. The second control resource set is located within the second bandwidth (in the figure denoted as UE1 $2^{nd}$ RB BW). The second bandwidth is a subset of the system bandwidth, i.e., the second bandwidth is smaller than or equal to the system bandwidth. In FIG. 6, the second control resource set is defined only in a subset of OFDM symbols (three first symbols in each slot) in the time domain.

Figure 7:
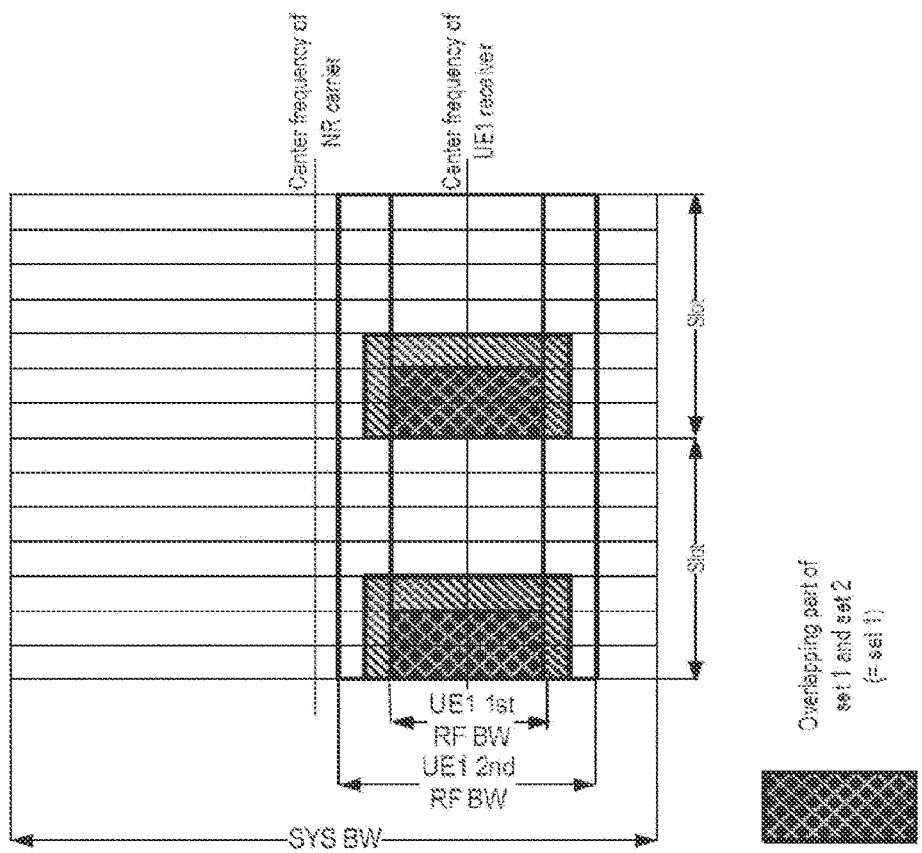
FIG. 7 is a schematic drawing showing an exemplary configuration of a first and a second control resource sets centered in frequency.

As mentioned above, in general, the second bandwidth may overlap with the first bandwidth. However, the present disclosure is not limited to such configuration and the first and the second bandwidths do not have to overlap. A special example in which the first bandwidth forms a part of the second bandwidth is shown in FIG. 7. In particular, FIG. 7 shows the same OFDM grid in FIGS. 5 and 6 in which the first bandwidth (UE1 $1^{st}$ RF BW) is fully included in the second bandwidth (UE1 $2^{nd}$ RF BW). In this example, the center frequency of both the first bandwidth and the second bandwidth is the same (Center frequency of UE1 receiver). As can be seen in FIG. 7, in this example the first control resource set is also fully included in (and overlaps with) the second control resource set.

In other words, after UE capability transfer, the gNB is ready to configure the second control resource set and the second bandwidth for the UE. According to FIG. 7, the first and the second bandwidth for the UE are centrally aligned, i.e., the center frequency of the first bandwidth is the same as the center frequency of the second bandwidth. This alignment provides the advantage that no retuning is necessary when the UE switches between monitoring of set 1 and set 2 which results in less transition time necessary between monitoring of the two sets. Moreover, since no indication of the center of the bandwidth is necessary a message size may also be reduced for configuring the second control resource set.

Figure 8:
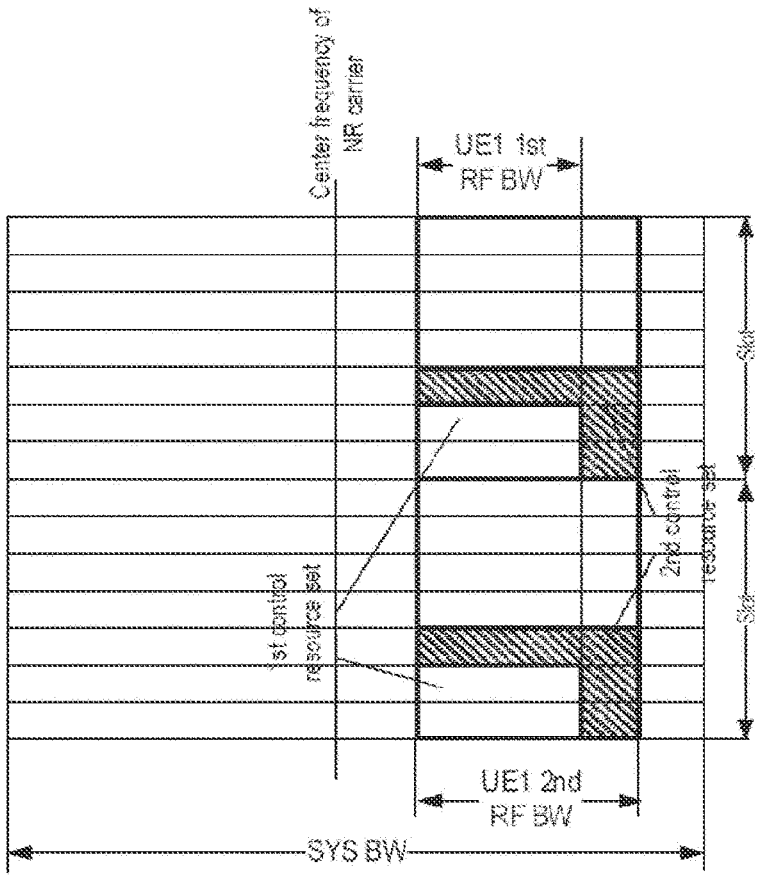
FIG. 8 is a schematic drawing showing an exemplary configuration of a first and a second control resource sets not centered in frequency.

FIG. 8 illustrates another example of set 1 and set 2, where set 1 and set 2 are non-overlapping and set 2 contains UE-specific DCI only. The connected state UE can be configured to monitor both set 1 and set 2. In particular, FIG. 8 illustrates another example according to which the first bandwidth and the second bandwidth are not centered with respect to each other. In this example, still, the first bandwidth and the second bandwidth fully overlap, while the first bandwidth forms a part of the second bandwidth. However, the first control resource set is not a subset of the second control resource set.

Figure 9:
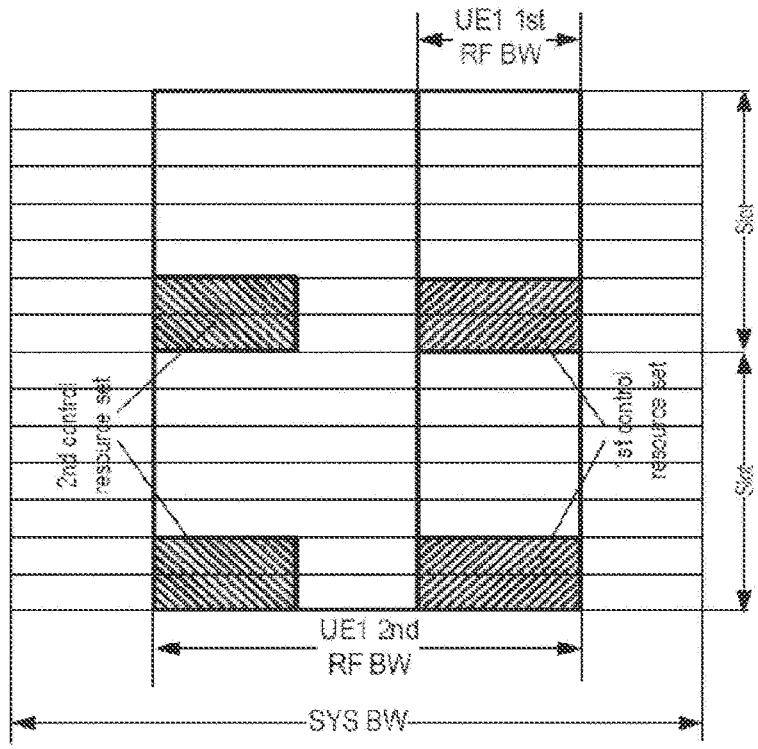
FIG. 9 is a schematic drawing illustrating an example of a configuration with disjoint first and second control resource sets.

FIG. 9 illustrates an example of a configuration, in which the first bandwidth is part of the second bandwidth. However, the first control resource set and the second control resource set are disjoint and discontinuous. In other words, set 1 and set 2 are non-contiguous and set 2 contains UE-specific DCI only. The connected state UE can be configured to monitor both set 1 and set 2. This provides more flexibility for gNB to configure the control resource set. However, in FIG. 9 the 2nd UE operating BW is much larger than that in FIGS. 7 and 8 in order to take the disjoint part into account and in particular, to enable the UE to monitor both set 1 and set 2.

It is noted that any of (or both) set 1 and set 2 in any of the above shown examples may be shared by multiple UEs.

The examples described with reference to FIGS. 5 to 9 all show a continuous UE operating BWs ($1^{st}$ and $2^{nd}$ UE operating BW), i.e., RF BW is formed by N neighboring subcarriers. For UEs with relatively large bandwidth capability, the frequency diversity can be achieved by mapping the control channel to distributed physical resource blocks (PRBs) in frequency domain within one control resource set and still inside the UE supported bandwidth. With such a distributed mapping in frequency domain, frequency diversity is improved. Physical Resource Blocks are scheduling units, each having a size of a plurality of subcarriers and a plurality of symbols.

A further improvement of frequency diversity maybe achieved by frequency hopping where both the control resource set and the associated RF BWs consist of non-contiguous frequency portions and UE's receive window is hopped among those portions (i.e., one portion at one time). This may provide a desirable frequency diversity improvement in particular for the UEs with low bandwidth capability, e.g., mMTC UEs. For such narrowband UE it could be otherwise difficult to achieve frequency diversity.

An example of such hopping can be seen in FIG. 10. In this configuration, the communication device follows the hopping pattern defined for the control resource set. The term "hopping pattern" here refers to location of the control resource set instances in the time frequency grid. In particular, in case of frequency hopping, the hopping pattern specifies the changes of the frequency location of the control resource set instances over time.

Between the different patterns the UE may need to perform retuning. Accordingly in order to provide some transition time for retuning, it may be desirable to skip one or more OFDM symbols, i.e., not to assign these symbols to the control resource set patterns. In particular, FIG. 10 shows the system bandwidth (SYS BW) and hopping between two patterns and the corresponding respective to sub-bands. The first frequency portion 1010 includes a first instance 1015 of the first control resource set whereas the second frequency portion 1020 includes a second instance 1025 of the first control resource set. As can be seen in the figure, the first instance is separated from the second instance in time domain by one OFDM symbol (seventh symbol) which does not carry the first control resource set. When this pattern of the first and the second instance is repeated for each slot, it can be seen that there is also one null OFDM symbol between the second instance and in the following repeated first instance. The term "null" here means that the OFDM symbol does not carry any data (control or payload).

In the current example, the length of the timeslot is 14 OFDM symbols. Hopping is performed between two instances each seven OFDM symbols whereas the length of one instance is six OFDM symbols.

It is noted that the present disclosure is not limited to any particular number of OFDM symbols per slot or per subframe and to any particular number of slots per subframe. In general, the hopping can take place every K symbols or every arbitrary time unit. In order to facilitate a less complex UE implementation, it may be of advantage if the length of an instance of the control resource set is smaller or equal to the length of the K symbols.

FIG. 11 illustrates the relation between set 1 and set 2 with hopping, where set 1 is a subset of set 2. In this example, set 1 and set 2 have the same hopping interval, switching between the two instances in the respective two different bandwidths, is performed every seven OFDM symbols. In this example, the group common message/control information (DCI) is transmitted in the overlapping parts of set 1 and set 2. The first bandwidth and the second bandwidth are not centered. It is noted that the hopping pattern in general specifies the operation bandwidth change with the time units. The above examples only show hopping between two instances. However, the present disclosure is not limited thereto and there may be a longer chain of instances defined between which the bandwidth is switched. For instance a hopping pattern may also be defined over a plurality of subframes or slots, unlike the Examples above.

However, set 1 and set 2 do not necessarily have to have the same hopping pattern. The advantage of having the same hopping pattern for two sets is the reduced monitoring effort for the communication device (UE).

As mentioned above, a control resource set configuration may include various different parameters, of which the values can be optimized for different use cases such as eMBB or URLLC or the like. In particular, the communication device receives from the base station the system information such as system information necessary to perform the random access procedure and including a list of entries for different respective configurations of the first control resource set.

For example, an entry may have the following parameters for the Pt control resource set candidate:
  subcarrier spacing (SCS) which defines the interval in frequency domain between two adjacent subcarriers;
  set bandwidth (BW) defining the bandwidth of the control resource set;
  frequency location of the control resource set which defines the center frequency of the control resource set;
  alternatively to signaling the center frequency and the width, the set BW and its frequency location can be indicated by the PRB (physical resource block) indices that the set consists of;
  $1^{st}$ RF BW (operation bandwidth, i.e., the bandwidth in which any resources are located which are schedulable by the control information carried by the set) may be assumed to be equal to the set BW. In such case, no additional parameter is needed. However, if the bandwidth of the set differs from the operation bandwidth, then the separate parameter may be included; and
  physical random access channel (PRACH) resources (including preamble sequences and PRACH time-frequency resources).

An exemplary list of candidate control resource sets may have, for instance, the following entries:
  Entry1: SCS=15 kHz, set BW=5 MHz, center frequency of the set, PRACH time-freq resources, preamble sequences; and
  Entry2: SCS=60 kHz, set BW=20 MHz, center frequency of the set, PRACH time-freq resources, preamble sequences.

In other words, Entry1 has a carrier spacing of 15 kHz and bandwidth of the set is 5 MHz, here assumed to be the same as the operation bandwidth (as in the example shown in FIG. 5). The center frequency indicates the location of the band within the system bandwidth. The PRACH resources may include the location of the corresponding PRACH resources in the grid and the preamble sequence(s) which may be used with this set.

For instance, entry 1 may be selected by eMBB UEs whereas entry 2 may be selected by the URLLC UEs. In general, if UE supports multiple services and/or numerologies, it may randomly select one of the entries which match one of its numerologies. Alternatively, there may be a predefined default numerology based on which the UE selects the entry.

As another alternative, the UE may select the entry based on its UE ID. For example, the entry may be selected by applying the following exemplary rule:

selected_entry_index=UE_ID mod number_of_numerologies_it_supports, where mod is the modulo operation, the selected_entry_index is the result of the selection (specifying the index of the entry among selectable entries within the set) and number_of_numerologies_it_supports is the number of numerologies supported by the UE with the UE_ID.

As yet another alternative, the UE may select an entry based on its channel conditions. For instance, if channel is good, then select PRACH resources with low diversity; otherwise select PRACH resources with high diversity (e.g., high repetition level occupying more uplink time-frequency resources).

The selection of the entry in the control resource candidate list provides the advantage of associating random access procedure with a particular numerology and bandwidth so that no explicit signaling is needed between the communication device and the base station. Rather, by performing the random access procedure the base station is implicitly informed of the selected set of control resources which will be monitored by the communication device and which can be used by the base station to transmit to the communication device control information.

The same configuration parameters as for the above example of set 1 maybe also used for set 2. However, signaling overhead in terms of system information may be further reduced if the entries of the second set are only configured with a subset of parameters of the first set configuration and the remaining parameters are assumed to be the same as for the first set. For example, set 2 may be configured only with the second bandwidth. The remaining parameters may be considered to be the same as for set 1 previously selected by the UE.

An example of set 2 configuration parameter list may be as follows:

set 2 BW defining the bandwidth of the control resource set 2;

$2^{nd}$ RF BW (second bandwidth) which defines the frequency resources to which the scheduling grants in DCI are applied; and no PRACH resources needed for set 2.

In the above set 2 configuration example, the set 1 and set 2 are centrally aligned in frequency domain (as shown in FIG. 7) so that no explicit signaling for indicating the location of set 2 is necessary. However, the present disclosure is not limited thereto and set 2 may be also configurable with a separate parameter of the set 2 bandwidth.

In some of the above examples, the first control resource set carries both (group) common DCI and UE specific DCI. Accordingly, serving too many terminals may cause congestion. In other words, it may be difficult to receive user specific DCIs if there are many UEs to be provided with a DCI. This may be especially relevant if a lot of UEs select the same control resource set. In order to reduce the congestion probability, an additional selection criterion apart from the numerology may be applied.

Another example of entries in the list of candidate sets may look as follows:

Entry1: SCS=15 kHz, set BW=5 MHz, 5 MHz<=UE capability<=20 MHz (selection criteria), center frequency of the set, preamble sequences, PRACH time-freq resources;

Entry2: SCS=15 kHz, set BW=5 MHz, 20 MHz<=UE capability<=80 MHz (selection criteria), center frequency of the set, preamble sequences, PRACH time-freq resources; and Entry3: SCS=60 kHz, set BW=20 MHz, 20 MHz<=UE capability<=80 MHz (selection criteria), center frequency of the set, preamble sequences, PRACH time-freq resources.

For instance, Entry1 is characterized by the SCS of 15 kHz and the bandwidth of the set is 5 MHz, here assumed to be same as the operating bandwidth. Moreover, the UE bandwidth capability is from the UE capability bandwidth range between 5 MHz and the 20 MHz. The remaining parameters are as in the above example.

The communication device then selects one set according to both its numerology and the selection criteria. For instance, in the above list, entry1 and entry2 have both the same subcarrier spacing and bandwidth and are thus both well suited and targeted for the same use case such as eMBB operation. However, they differ with respect to the UE capability which is here the additional selection criterion. In particular, entry1 is for a UE with bandwidth capability between 5 MHz and 20 MHz whereas entry2 is for a UE with bandwidth capability between 20 MHz and 80 MHz. Accordingly, UEs that have the bandwidth capability between 20 MHz and 80 MHz (such as 40 MHz), may select entry2, while the UEs that have the bandwidth capability below 20 MHz (such as 10 MHz) may select entry1. Entry3 is, for example, suited and targeted for the URLLC use case.

In particular, the communication device may set its first operating bandwidth to the minimum requirement of the UE capability for the same numerology. According to the example list of entries 1-3 shown above, if the UE supporting 15 kHz SCS has the bandwidth capability of 80 MHz, entry2 will be selected and the $1^{st}$ RF UE operating BW can be set to 20 MHz (corresponding to the minimum requirement of the selection criteria in entry2, or in other words, corresponding to the lowest value of the UE capability range parameter). An advantage of such setting is that since the gNB (or scheduler) knows that all UEs monitoring the set of entry2 has the BW capability of at least 20 MHz, DCI conveyed by this set can schedule the resources matching this 20 MHz BW without worrying about the detection failure of any UE. On the other hand, choosing the 20 MHz operating BW for the UE with 80 MHz capability saves the monitoring power consumption.

In the above example, entry3 is the only one entry for the numerology with SCS=60 kHz. However, the present disclosure is not limited thereto. In general, there may be also one or more additional entries with the same SCS and BW and different values of the additional selection parameter.

In case that the set BW is smaller than UE 1st RF operating BW (the first bandwidth):

the control resource set may be centrally located inside the first bandwidth in the frequency domain so that no signaling for central frequency is necessary. The size relation between the control resource set BW and the first BW may be specified in standard or signaled; or alternatively, the offset between the center of the set and the center of the first bandwidth can be also included as one parameter; or alternatively, the UE can perform blind decoding within the first bandwidth.

Thus, congestion problems may be reduced by properly grouping the communication devices according to an additional selection criterion or criteria. One possible selection criterion is the UE capability range in terms of bandwidth, as mentioned in the above example. With such selection criterion, the range of UE bandwidth capability is implicitly known to the gNB during the random access procedure. Accordingly, the gNB can provide a DCI with resource allocation within the first control resource set, which schedules resources matching the UE's capability, i.e., resources located in the bandwidth which is included in the UE capability (e.g., minimum UE capability range value). It is noted that the above example shows only two different UE capability ranges. However, in general there may be more than two such capability ranges used as selection criteria.

The entries of the list of candidate sets may also include an additional parameter indicating whether hopping is enabled or disabled and possibly also signaling of the hopping pattern. An example of such a list is provided in the following:

Entry1: SCS=15 kHz, set BW=5 MHz, 5 MHz<=UE capability<=20 MHz (selection criteria), center frequency of the set, hopping=false, PRACH sequences, PRACH time-freq resources;

Entry2: SCS=15 kHz, set BW=5 MHz, 20 MHz<=UE capability<=80 MHz (selection criteria), center frequency of the set, hopping=false, PRACH sequences, PRACH time-freq resources;

Entry3: SCS=60 kHz, set BW=20 MHz, 20 MHz<=UE capability<=80 MHz (selection criteria), center frequency of the set, hopping=false, PRACH sequences, PRACH time-freq resources; and Entry4: SCS=15 kHz, set BW=180 kHz, 1.4 MHz<=UE capability<=5 MHz (selection criteria), center frequency of the set, hopping=true, hopping pattern, PRACH sequences, PRACH time-freq resources.

Thus, there are different hopping options for the respective different entries of the list. The hopping may be switched on (value hopping=true in the example) or off (value hopping=false in the example). If the hopping is true, a predefined or preconfigured hopping pattern may be applied.

In the above example, entries 1 and 2 may be suitable for the eMBB use case, whereas entry 3 may be suitable for the URLLC use case. Entries 1-3 have hopping switched off. In addition, for entry 4 with the lowest bandwidth, hopping is switched on and an additional parameter hopping pattern is configured. The parameter hopping pattern indicates the hopping pattern. This may be performed by referring to one of a plurality of specific patterns which may be defined in a standard or configured by system information or the like. Entry 4 may be particularly efficient for the low-bandwidth use cases such as mMTC as it enables providing frequency diversity even for UEs with very low BW capability.

There may be also a plurality of entries which differ (only) in the hopping pattern which may be specified as an additional parameter.

The above entry lists are only exemplary. Lists with more entries with different parameter combinations may be provided. Providing more selection freedom may help reducing the congestion probability.

In order to obtain more flexibility for configuration, other parameters in the basic parameters mentioned above may be also configured for the second set of control resources.

For a first eMBB UE a following first and second control resource sets may be defined:

Set1: SCS=15 kHz, set BW=5 MHz, 5 MHz<=UE capability<=20 MHz (selection criteria), center frequency of the set, hopping=false, PRACH sequences, PRACH time-freq resources; and Set2: SCS=15 kHz, set BW=20 MHz, 2nd RF BW=20 MHz, center frequency of the set, hopping=false.

In particular, in this example set 1 has a set BW assumed to be the same as the first bandwidth, whereas set 2 enables separate configuration of the set bandwidth and the second bandwidth. Moreover, set 2 may be located on a different center frequency than set 1. In the above entry for set 2, however, the operating ($2^{nd}$ RF BW) bandwidth is still set the same as the set bandwidth.

For a second eMBB UE a following first and second control resource sets may be defined:

Set1: SCS=15 kHz, set BW=5 MHz, 20 MHz<=UE capability<=80 MHz (selection criteria), center frequency of the set, hopping=false, PRACH sequences, PRACH time-freq resources; and Set2: SCS=15 kHz, set BW=40 MHz, 2nd RF BW=40 MHz, center frequency of the set, hopping=false.

Moreover, for a possible URLLC UE, the two sets may be defined as follows:

Set1: SCS=60 kHz, set BW=20 MHz, 20 MHz<=UE capability<=80 MHz (selection criteria center frequency of the set, hopping=false, PRACH sequences, PRACH time-freq resources; and Set2: SCS=60 kHz, set BW=40 MHz, 2nd RF BW=80 MHz, center frequency of the set, offset between the center of the set and the center of 2nd BW, hopping=false.

In the above entry for set 2, the set bandwidth is smaller than the second bandwidth, and the offset is defined.

For a possible mMTC UE the following sets may be defined:

Set1: SCS=15 kHz, set BW=180 kHz, 1.4 MHz<=UE capability<=5 MHz (selection criteria), hopping=true, hopping pattern, PRACH sequences, PRACH time-freq resources; and Set2: SCS=15 kHz, set BW=360 kHz, 2nd RFBW=1.4 MHz, hopping=true, hopping pattern.

In particular, in this example, no center frequency for set 1 and set 2 is provided in the configuration parameters. A default location is used in this case. For example, the control resource sets are always located in the edges of the system bandwidth, as the example shown in FIGS. 10 and 11.

In the above example is the focus was given on the configuration of the control resource sets in the frequency domain. However, it may be also useful to consider the location of the control resource sets in the time domain.

Figure 12:
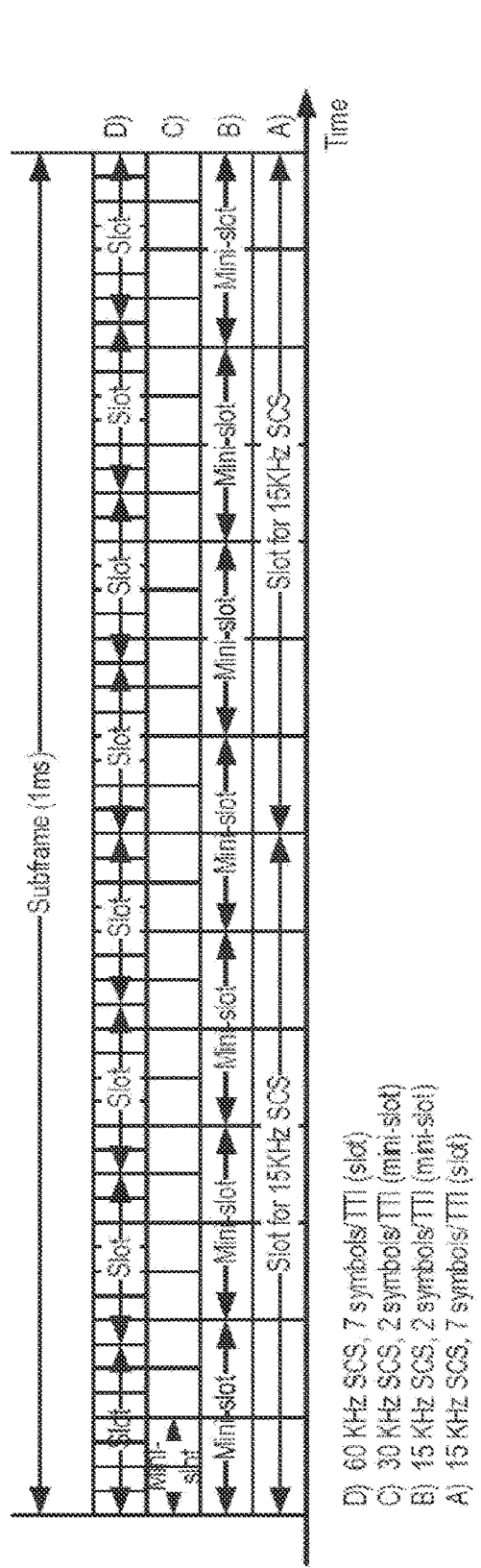
FIG. 12 is a schematic drawing illustrating how different scheduling units in time are aligned with the subframe boundary (every 1 ms)

FIG. 12 illustrates an exemplary aligning of different time units within a subframe. A subframe is a time unit having the length of 1 ms in this example. However, it is noted that the 1 ms subframe length is a mere example and the present disclosure is not limited to any particular time unit length. The subframe is further subdivided into slots or mini-slots. In order to support multiple numerologies, each numerology may have its own scheduling interval in terms of a slot or mini-slot length. As can be seen in FIG. 12, the scheduling intervals such as the slots and the mini-slots for different numerologies are aligned within the subframe boundary. Moreover, in FIG. 12, the following scheduling interval lengths are shown:

two 0.5 ms long slots in the subframe. This configuration is relevant for 15 kHz SCS with 7 symbols per TTI (scheduling interval);

7 mini-slots in the subframe. This configuration is relevant for 15 kHz SCS and 2 symbols per TTI;

16 mini-slots in the subframe. This configuration is relevant for 30 kHz SCS and 2 symbols via mini-slot; and 8 slots in the subframe. This configuration is relevant for 60 kHz and 7 symbols per TTI.

Figure 17:
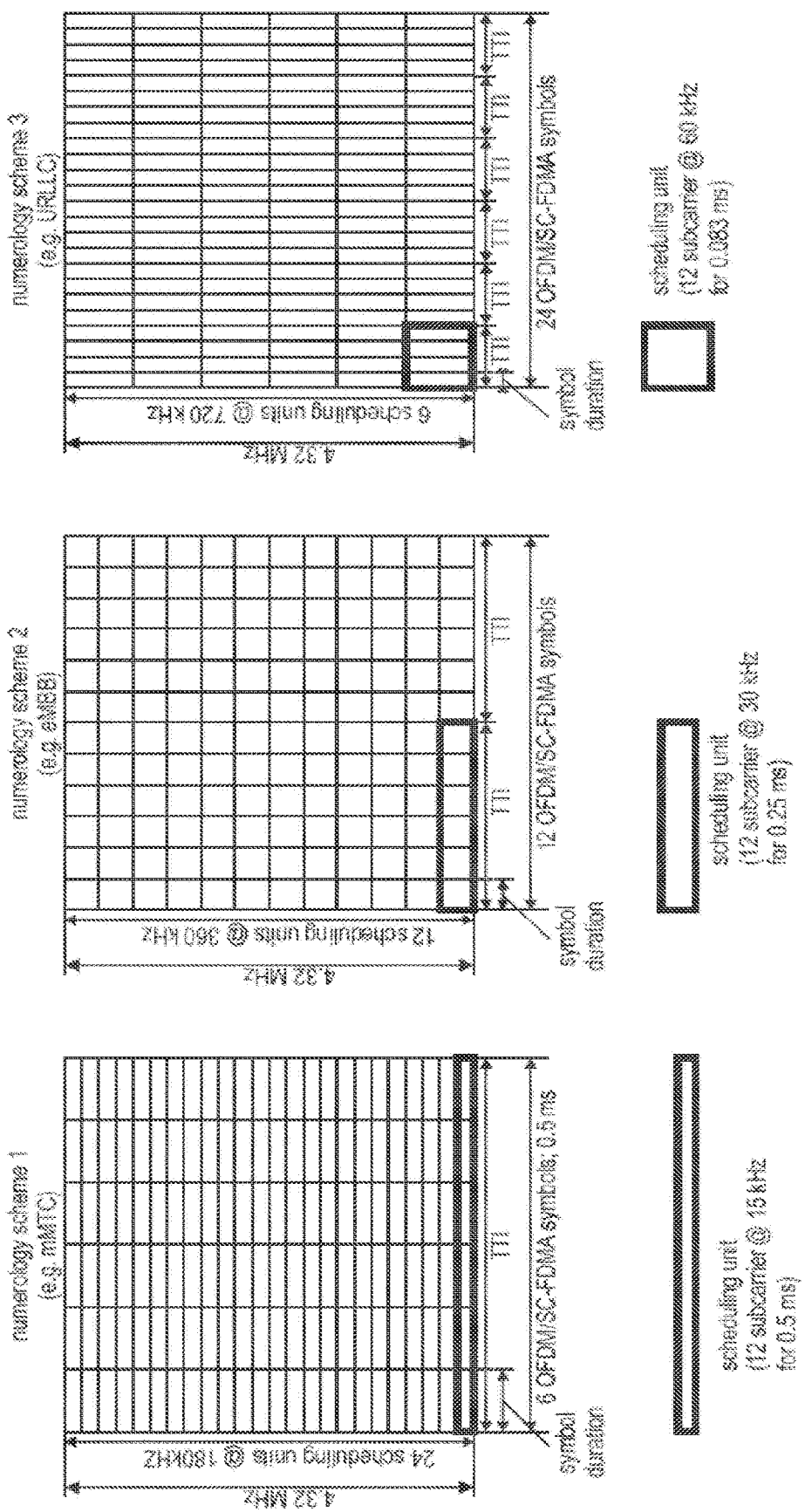
FIG. 17 is a schematic drawing illustrating the partitioning of radio resources according to three different numerologies schemes into corresponding resource scheduling units.

FIG. 17 shows exemplary numerology schemes. In particular, FIG. 17 is a simplified illustration of the partitioning of radio resources according to three different numerology schemes. The resulting resource scheduling units are illustrated with a bold square in each of the numerology schemes.

Figure 1:
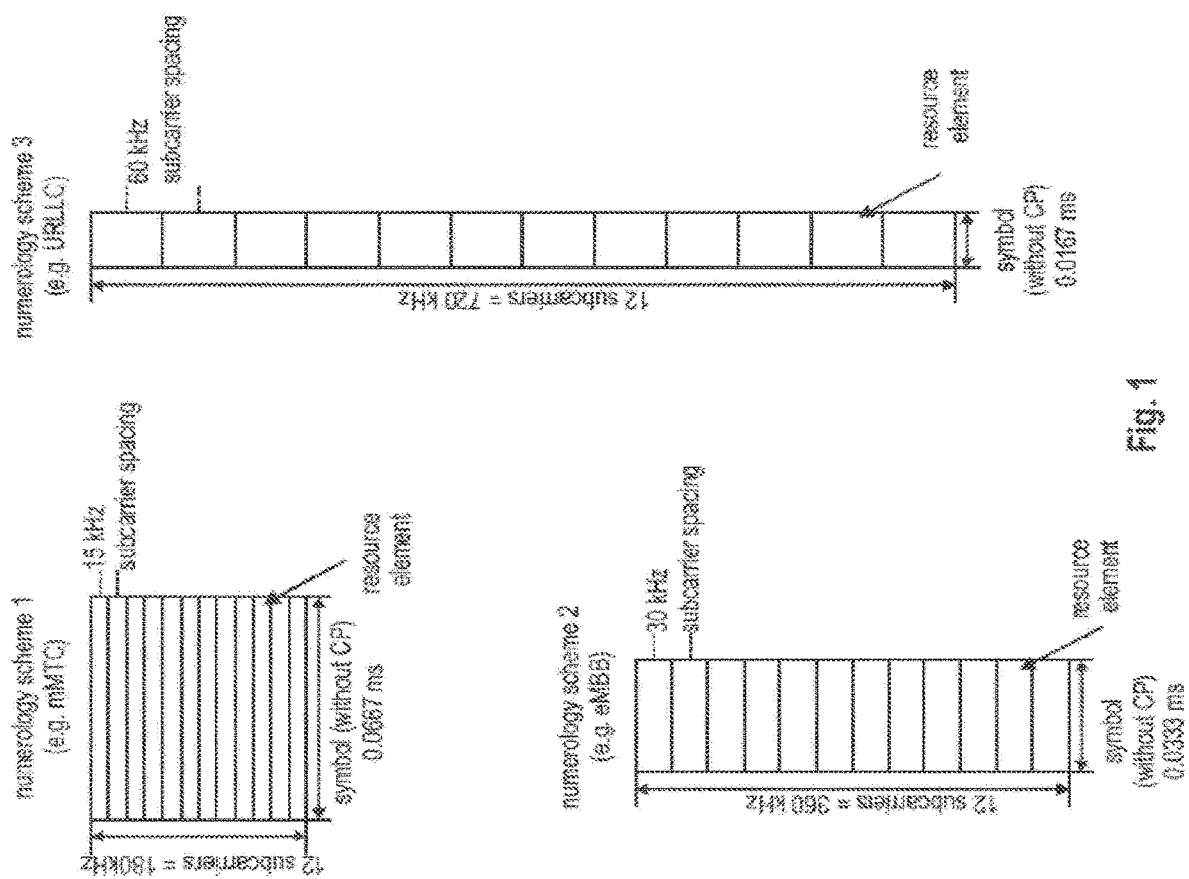
FIG. 1 is a schematic drawing illustrating different numerologies.

Numerology scheme 1 of FIG. 17 is characterized by having a subcarrier spacing of 15 kHz (with a resulting symbol duration of 66.7 µs; see FIG. 1), 12 subcarriers and 6 symbols per resource scheduling unit. The resulting resource scheduling unit has a frequency bandwidth of 180 kHz and a length of 0.5 ms (when exemplary considering a cyclic prefix of each 16.7 µs, as, e.g., known from LTE systems). Correspondingly, in the frequency domain the bandwidth of the frequency band will be partitioned into 24 resource scheduling units (each with 180 kHz bandwidth). With these numerology characteristics, numerology scheme 1 may be considered for the transmission of data for the mMTC service. A UE following that numerology scheme could thus be theoretically scheduled by the scheduler every TTI, i.e., 0.5 ms.

Numerology scheme 2 is characterized by having a subcarrier spacing of (2×15 kHz=) 30 kHz (with a resulting symbol duration of 33.3 µs; see FIG. 1), 12 subcarriers and 6 symbols per resource scheduling unit. The resulting resource scheduling unit has thus a frequency bandwidth of 360 kHz and a length of 0.25 ms (when exemplary considering a scaled cyclic prefix of 16.7 µs/2 each). Correspondingly, in the frequency domain the bandwidth of the frequency band will be partitioned into 12 resource scheduling units (each with 360 kHz bandwidth). With these numerology characteristics, numerology scheme 2 may be considered for the transmission of data for the eMBB service. A UE following that numerology scheme could thus be theoretically scheduled by the scheduler every TTI, i.e., 0.25 ms.

Numerology scheme 3 is characterized by having a subcarrier spacing of (4×15 kHz=) 60 kHz (with a resulting symbol duration of 16.7 µs; see FIG. 1), 12 subcarriers and 4 symbols per resource scheduling unit. The resulting resource scheduling unit has thus a frequency bandwidth of 720 kHz and a length of 0.0833 ms (when exemplary considering a scaled cyclic prefix of 16.7 µs/4 each). Correspondingly, in the frequency domain the bandwidth of the frequency band will be partitioned into 6 resource scheduling units (each with 720 kHz bandwidth). With these numerology characteristics, numerology scheme 3 may be considered for the transmission of data for the URLLC service. A UE following that numerology scheme could thus be theoretically scheduled by the scheduler every TTI, i.e., 0.0833 ms.

The different numerology schemes shall coexist in the mobile network, and radio resources of the different numerology schemes should be available for being allocated to user terminals as needed. There are several possibilities on how to multiplex the different numerologies within the frequency band and its radio resources in the frequency domain and/or the time domain. In general, so as to be able to allocate radio resources for data transmissions according to each numerology scheme, the available time-frequency radio resources of the frequency band should be split in an appropriate manner between the different numerology schemes coexisting in the system. Correspondingly, each numerology scheme is associated to a particular set of radio resources among the available radio resources of the frequency band which are then usable by the scheduler (such as the radio base station) for being allocated according to that numerology scheme, i.e., so as to allocate radio resources to transmit data for the corresponding service (here URLLC, mMTC, mMBB) following the numerology characteristics of the particular numerology scheme. In view of that the traffic amount for each service varies with time, this multiplexing of different coexisting numerology schemes for the services may also be flexible.

The communication device then monitors control resources at most once per scheduling interval. In order to reduce monitoring effort, the less frequently the monitoring takes place, the larger power savings may be obtained.

A UE can be configured with RRC, or in general with a higher layer protocol, regarding in which slots/mini-slots it would expect DCI within one subframe. The configuration could depend on DCI types (e.g., RA-RNTI, SI-RNTI, UE-specific DCI, etc.). For instance, a first slot in a subframe may be configured to carry common control information whereas a second slot within the same subframe may be configured to carry UE-specific control information and not to carry common control information. In addition, a slot which carries a group information may be specified, different from the first and the second slot, or the same. Such subdivision also enables reducing monitoring effort since on one slot only attempts to decode control information with a particular type of RNTI (or RNTI) may be done.

The size in time domain of the first control resource set and the second control resource set may be either implicitly determined by the communication device based on another configurable parameter or configured by the base station by explicit signaling. In particular, the number of symbols of a control resource set within a scheduling interval may be a fixed value depending on length of slot/mini-slot. In other words, the communication device determines the number of symbols for a control resource set based on a slot size (or a scheduling interval size). The manner of determining may be given in a standard for instance as a table of number of symbols of the control resource set for particular configurable slot sizes and/or sizes of the scheduling interval.

Alternatively, the size of the resource control set is configurable. In particular, the size of the resource control set (first or second) may be signaled in the first symbol of that resource control set (first and second, respectively), i.e., in a Physical Control Format Indicator Channel (PCFICH). However, the present disclosure is not limited to such signaling. Alternatively, the size of the resource control set in the time domain may constitute a parameter of the respective resource control set and may be selected by the communication device and indicated by the random procedure as indicated above for the numerology and/or the operation bandwidth range.

Moreover, the configurability of the size of the resource control set in the time domain may be configurable. For instance, a parameter "possibility of PCFICH configuration" can be included into the configuration parameters for set 1 and set 2. If the value of the parameter "possibility of PCFICH configuration" is false, a fixed value is used for the number of symbols of the respective set 1 and/or set 2. The fixed value is either a default value or a value determined by the communication device as mentioned above. If, on the other hand, the value of the parameter "possibility of PCFICH configuration" is true, the number of symbols is signaled by PCFICH located in the first symbol of control set.

The communication device may employ different control resource sets in various way. For instance, according to a first option (Option 1), different sets are configured for different numerologies. The UE should do blind decoding within all configured control resource sets. In particular, the base station may control the communication device to monitor one or more configured control resource sets such as the first control resource set and the second control resource set and/or another, third, fourth, etc., control resource set. For instance, there may be a control resource set transmitted on a numerology similar to the numerology of the resources scheduled by the control information (DCI) carried in that set. Nevertheless, the monitoring effort grows with each new monitored set.

It order to further reduce the monitoring effort, according to Option 2, one set is configured to carry DCI for data transmission of other numerology schemes. In other words, the numerology of the control resource set may differ from the numerology of the resources scheduled by the control resources of that control resource set. One of the advantages of this approach is that a UE only needs to monitor one numerology scheme for control information. The control information (DCI) may then also indicate the numerology that will be used by the data transmission allocated (scheduled) by that DCI.

The frequency resources for control resource sets and associated RF BWs may be indicated by their absolute values or by an index assigned to their particular values for instance in standard. Alternatively, in order to provide enough flexibility of signaling and at the same time save the signaling resources, the frequency resources for a control resource set (first and/or the second) may be indicated with respect to the resource grids in the same numerology scheme that the set is intended to.

Figure 13:
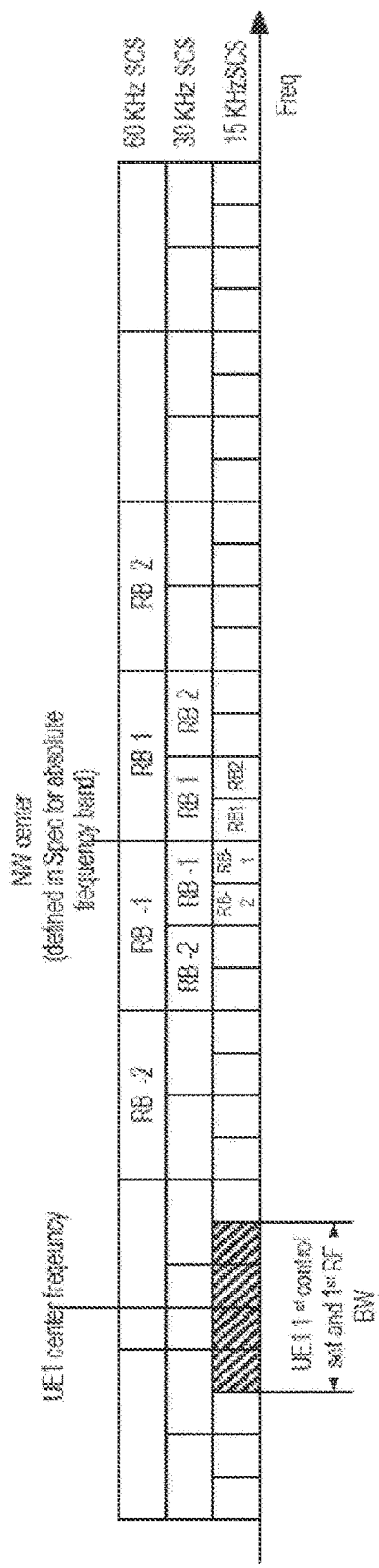
FIG. 13 is a schematic drawing which illustrates how control resource set is indicated in frequency domain.

For example, the resource grids are defined per numerology scheme and known to both gNB and UE. The grids do not change with respect to resource allocation. This is illustrated in FIG. 13. In particular, FIG. 13 shows in the three rows three respective grids for the three respective different numerologies with 60, 30 and 15 kHz subcarrier spacing. The UE1 in FIG. 13 may be notified its $1^{st}$ RF BW as {RB #-13 to RB #-10} with 15 KHz SCS. In other words, the first bandwidth and/or the second bandwidth may be indicated by means of the index of the lowest resource block (RB) and the highest resource block belonging to the respective bandwidth. The resource block may be the smallest allocable unit in the frequency domain and may include a number of subcarriers, e.g., 12 subcarrier.

Accordingly, the control information (for instance higher layer signaling such as dedicated RRC signaling or broadcasted system information, and physical layer signaling) carrying the control resource set may be signaled with an improved efficiency.

However, it is noted that the present disclosure is not limited to such signaling. In general, the operation bandwidth may be signaled by means of its center frequency and width or in any other way such as the lowest RB and the bandwidth.

Moreover, the above described signaling may be used to indicate any subband of the system band by means of the lowest and highest frequency (indicated by the resource block index). In other words, this way of signaling is not limited to signaling the operation bandwidth and may be used to indicate any frequency band or range (for instance the capability bandwidth range described above with respect to the candidate set configurations).

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSIs may be individually formed as chips, or one chip may be formed so as to include a part or all of the functional blocks. The LSIy may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, or a general-purpose processor, or a special-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Figure 14:
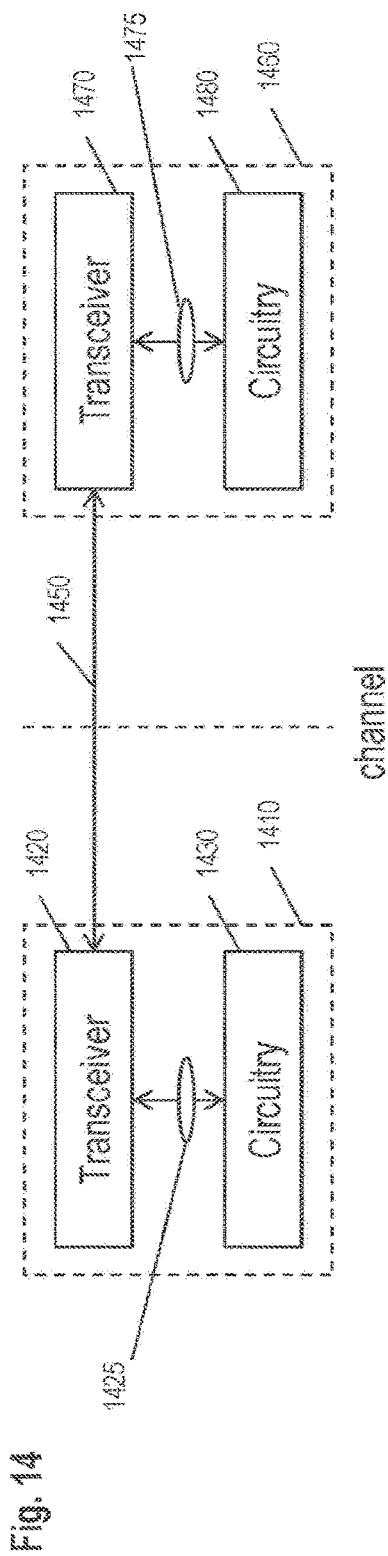
FIG. 14 is a block diagram showing structure of a communication device and a base station.

FIG. 14 illustrates a block diagram of a system including a communication device 1410 and a scheduling device 1460 communicating with each other over a (wireless) physical channel 1450. The communication device 1410 comprises a transceiver 1420 and a circuitry 1430. The transceiver 1420 comprises a receiver and a transmitter. The circuitry 1430 may be one or more pieces of hardware such as one or more processors or any LSIs mentioned above. Between the transceiver 1420 and the circuitry 1430 there is an input/output point 1425 over which the circuitry, when in operation, controls the transceiver 1420, i.e., controls the receiver and/or the transmitter and exchange received/transmitted data. The transceiver 1420 may include the RF front including one or more antennas, amplifiers, RF modulator/demodulator and the like. The circuitry 1430 may in particular implement control tasks such a controlling the transceiver 1420 to transmit user data and control data provided by the circuitry and/or receive user data and control data which is further processed by the circuitry.

Figure 15:
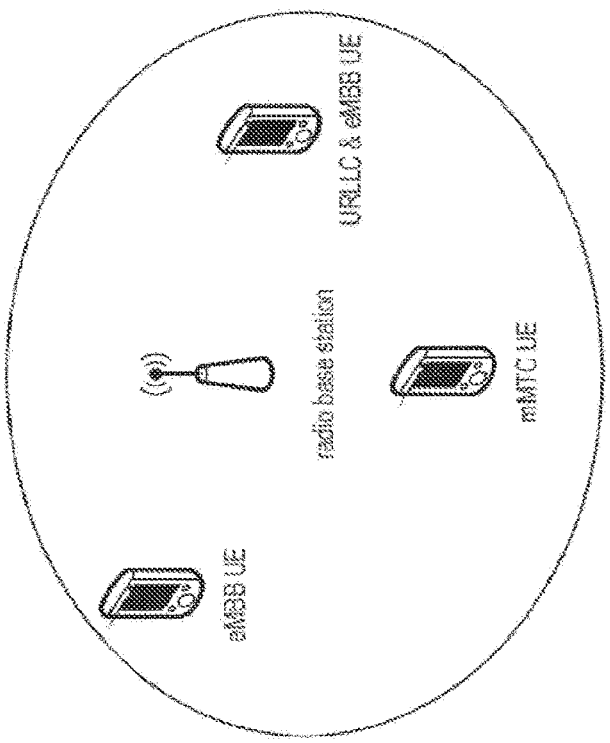
FIG. 15 is a block diagram showing architecture of a communication system.

In FIG. 15, a simple and exemplary scenario is shown with a radio base station and several user terminals. The three illustrated UEs respectively support different services, namely the mMTC, eMBB, and URLLC services already introduced in the background section. As illustrated, it is assumed that one UE shall support and be configured for two different services, exemplarily URLLC and eMBB services.

The radio base station of FIG. 15 may correspond to the base station 1460 of FIG. 14. Any of the three UEs of FIG. 15 may correspond to the communication device 1410 of FIG. 14.

According to an embodiment, a communication device 1410 is provided and comprises a receiver 1420 capable of receiving control signal from a base station 1460 in a first set of control resources and in a second set of control resources. The communication device 1410 further comprises a transmitter 1420 capable of transmitting control signals and data and a circuitry 1430 which, when in operation, controls:

the transmitter to transmit a random access message associated with the first set of control resources and to transmit a communication device capability indication;

the receiver to monitor control resources in the first set of control resources after transmitting the random access message and to receive within the first set of control resources indication of configuration of the second set of control resources; and the receiver to monitor control resources in the first set of control resources and/or in the second set of control resources after receiving the configuration of the second set of control resources.

The indication of configuration of the second set of control resources may be for instance resource allocation for a higher layer signaling carrying configuration of the second set of control resources for the communication device. However, the present disclosure is not limited to this example. For instance, the indication may be also a direct reference to the second control resource set.

The first set of control resources is located within a first bandwidth and the second set of control resources is located within a second bandwidth. Here, the first bandwidth is bandwidth in which any resources allocated by control information carried in the first set of control resources are located, and the second bandwidth is bandwidth in which any resources allocated by control information carried in the second set of control resources are located.

The first and the second bandwidth may be the same. In other words, allocations received within the first resource set may span the same operating bandwidth as the allocations received within the second resource set. However, if the first bandwidth is a subset of the second bandwidth, the monitoring effort and power consumption may be reduced.

In one example, the first bandwidth and the second bandwidth are mutually centered in the frequency domain. Correspondingly, the bandwidths of the respective first and second control resource sets may also be centered with respect to each other.

Concerning the relation between the two sets, in one example a bandwidth of the first set of control resources is included in a bandwidth of the second set of control resources. Even farther, the first set of control resources may be a subset of the second set of control resources. For instance, if the resources are defined in a time-frequency grid of symbols in time and subcarriers in frequency, in addition, the symbols carrying the first set of control resources may be included in the symbols carrying the second set. However, the present disclosure is not limited by the relation between set 1 and set 2 in the time domain.

According to another example, the first control resource set and the second control resource set are disjoint or overlap only partly in the frequency domain.

It is noted that the bandwidth of the first control resource set may be equal to or smaller than the first bandwidth. Similarly, the bandwidth of the second control resource set may be smaller than or equal to the second bandwidth.

In any of the above examples, the first set of control resources advantageously includes a common control information for being decoded by a plurality of communication devices as well as a user specific control information for being decoded only by a specific communication device, and the second set of control resources includes the user specific control information.

It is noted that the second set of control resources may also include a (group) common control information, which is especially the case when set 1 is a subset of set 2. On the other hand, if set 1 and set 2 are disjoint (or partially overlapping), set 2 does not have to include any (group) common control information.

The circuitry, when in operation, may control the receiver to monitor the first set of control resources if the communication device is in an operation mode facilitating power saving.

The mode facilitating the power saving may be, for instance, a mode in which the communication device has no active data connection or has a data connection with only low activity (e.g., below certain traffic threshold). For example, the mode facilitating the power saving may correspond to an idle mode as defined in LTE (no data bearer established).

In addition, the circuitry, when in operation, may control the receiver to monitor the second set of control resources if the communication device is not in the mode facilitating power saving. In addition to the monitoring of the second set, the receiver may also be controlled to still monitor the first set.

Alternatively, the circuitry, when in operation, may be configured to control the receiver to monitor the first set of control resources if the communication device traffic does not exceed a threshold, and to control the receiver to monitor the second set of control resources if the communication device traffic exceeds the threshold. The threshold may be configured by a base station and provided to the communication device via higher layer signaling. Alternatively, it may be specified by a standard. Alternatively, the threshold may be only used at the base station and the base station instructs the communication according to the threshold whether the first or the second control resource set is to be monitored.

In order to further improve the frequency diversity, the first control resource set is distributed in frequency domain and the circuitry, when in operation, controls the receiver to perform frequency hopping every first predetermined time interval to monitor the first control resource set.

In one example, the second control resource set is distributed in frequency domain, the circuitry, when in operation, controls the receiver to perform frequency hopping every second predetermined time interval to monitor the second control resource set, and the hopping pattern for the first control resource set is similar as for the second resource set.

The first and the second predetermined time interval may be a certain number, K, of symbols or a slot or a subframe, or the like. They may be the same or different from each other. It is noted that the frequency hopping can generally be applies to first set only, to second set only, to none of the sets or to both of them.

In an example, the second control resource set is distributed in frequency domain, the circuitry, when in operation, controls the receiver to perform frequency hopping every second predetermined time interval to monitor the second control resource set, and the hopping pattern for the first control resource set differs from the hopping pattern for the second resource set at least in frequency band in at least one time interval.

The hopping pattern for a first set of control resources defines the sequence of the first set's bandwidths (and corresponding operating bandwidths) changing in time. The pattern may be applied repeatedly and periodically.

According to an example combinable with any of the above examples, the circuitry is further configured to control the receiver to receive system information including a list of entries in which an entry represents a respective candidate for the first control resource set configuration, and to select the first control resource set configuration.

The selection may be performed, for instance, based on the supported numerology.

In particular, first control resource set configuration parameters include at least one of a subcarrier spacing and a bandwidth for the first control resource set and at least one of a preamble sequence and a resource for a random access channel.

In one example, the circuitry, when in operation, selects the first control resource set according to the at least one of a subcarrier spacing and a bandwidth for the first control resource set which is supported by the communication device.

It is noted that the second control resource set configuration may be also given by second control resource set configuration parameters including at least the bandwidth for the second control resource set or the second bandwidth (operating bandwidth for receiving data scheduled by the control information carried in the second set). However, the second control resource set configuration parameters may also include numerology.

In one example, the first control resource set configuration parameters further include a range of the bandwidth capability of a communication device, and the circuitry, when in operation, selects the first control resource set also according to the bandwidth capability of itself.

Moreover, the circuitry, when in operation, in case the communication device supports more than one configurations, may perform selection of the first control resource set configuration as either of:
  random selection of one of the supported configurations;
  selection of a configuration with a default subcarrier spacing and/or bandwidth for the first control resource set;
  selection based on an identifier of the communication device; and
  selection based on current channel conditions of the communication device.

The first control resource set configuration parameters and/or the second control resource set configuration parameters may also further include a hopping indication specifying whether or not a frequency hopping is to be applied to the corresponding control resource set.

Moreover, the first control resource set configuration parameters and/or the second control resource set configuration parameters may further include a hopping pattern indication in the case when the hopping indication indicates that hopping is to be applied to the corresponding control resource set.

The hopping pattern indicates the sequence of frequencies (bandwidths) carrying the control resource set in time.

The configuration of the second control resource set may include either bandwidth of the second control resource set or the second bandwidth, or a subset of configuration parameters, and the circuitry, when in operation, applies the remaining parameters of the first control resource set to the second control resource set.

In one exemplary embodiment, the circuitry, when in operation, controls the receiver:
  resource set;
  to monitor the first control resource set and/or the second control
  to receive within the first control resource set and/or the second control resource set control information indicating a resource allocation for data transmission to the communication device; and
  wherein the resource allocation also indicates time-frequency numerology including at least one of the subcarrier spacing, bandwidth, number of symbols or cyclic prefix length.

The present disclosure also relates to the scheduling node 1460 comprising a transmitter 1470 capable of transmitting control signal to a communication device in a first set of control resources and in a second set of control resources, a receiver 1470 capable of receiving control signals and data, and a circuitry 1480 which, when in operation, controls:
  the receiver to receive a random access message associated with the first set of control resources and to receive communication device capability indication;
  the transmitter to transmit control information in the first set of control resources after receiving the random access message and to transmit within the first set of control resources indication of configuration of the second set of control resources; and
  the transmitter to transmit control information in the first set of control resources and/or in the second set of control resources after transmitting the configuration of the second set of control resources.

As can be seen in FIG. 14, there is also an input/output node 1475 located between the transceiver 1470 which includes the transmitter and the receiver and the circuitry 1480. The input/output node 1475 serves to input/output of data and control commands between the transceiver 1470 and the circuitry 1480. The scheduling node 1460 may be for instance a base station. However, the present disclosure is not limited thereto and the scheduling node may be a relay node or a communication device operating as a base station or relay node for other communication devices.

As can be also seen in FIG. 14, the communication device and the base station both employ the same configuration of set 1 and set 2 and exchange the configuration information as already described above with reference to the communication device. Accordingly, the above describes embodiments and examples which were explained with focus on the communication device apply also to the scheduling node (base station).

The present disclosure also provides the corresponding methods which may be performed by the circuitry 1430 of the communication device 1410 and/or by the circuitry 1480 of the base station 1460. In particular, the circuitries may control the corresponding receiver/transmitter of the communication device and base station to perform the receiving/transmitting tasks as shown below.

Figure 16:
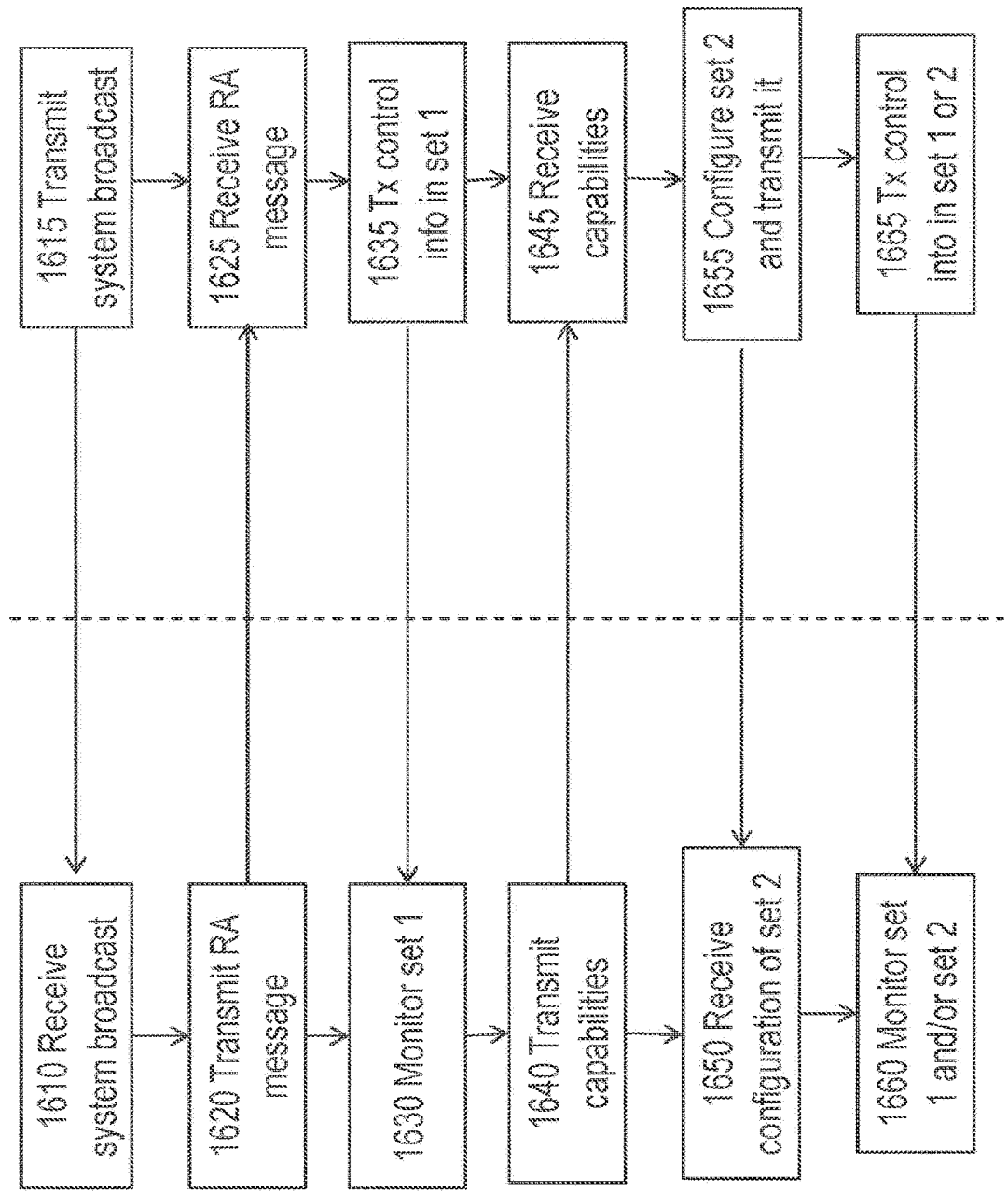
FIG. 16 is a flow diagram showing method for configuration of set 1 and set 2 at the communication device and the base station.

In particular, as also illustrated in FIG. 16, a method is provided for a communication device comprising the steps of:
  transmitting 1620 a random access message associated with a first set of control resources;
  monitoring 1630 control resources in the first set of control resources after transmitting the random access message;
  transmitting 1640 communication device capability indication;
  after transmitting 1640 the communication device capability indication, receiving 1650 within the first set of control resources indication of configuration of the second set of control resources; and
  monitoring 1660 control resources in the first set of control resources and/or in the second set of control resources after receiving the configuration of the second set of control resources.

Moreover, before the transmission of the random access message, the method may also comprise reception 1610 of the control information including configuration of candidate first control resource sets. This control information may be received within the system broadcast.

Moreover, a method is provided for a scheduling node comprising the steps of:
- receiving 1625 a random access message associated with the first set of control resources;
- receiving 1645 communication device capability indication (after receiving 1625 the random access message);
- transmitting 1635 control information in the first set of control resources after receiving 1625 the random access message;
- transmitting 1655 within the first set of control resources indication of configuration of the second set of control resources; and
- transmitting 1665 control information in the first set of control resources and/or in the second set of control resources after transmitting the configuration of the second set of control resources.

It is noted that the above described steps may be performed as disclosed in the above with respect to the actions performed by the respective device.

Moreover, the above examples refer to the "communication device" or "UE" or "base station" or "gNB" or "scheduling device". However, it is noted that already the respective circuitry of these devices (see FIG. 14, circuitry 1430 and 1480) alone provides improvements described above. The circuitry controls the transmitter and the receiver of the device wherein the transmitter and receiver of the device may be a standard wireless transmitter and receiver including for instance one or more antennas, amplifier(s) and modulator(s). The control is performed by outputting control commands to the input/output node (1425, 1475) and by inputting from the input/output node the received data (control and/or user data) for further processing by the circuitry.

Figure 18:
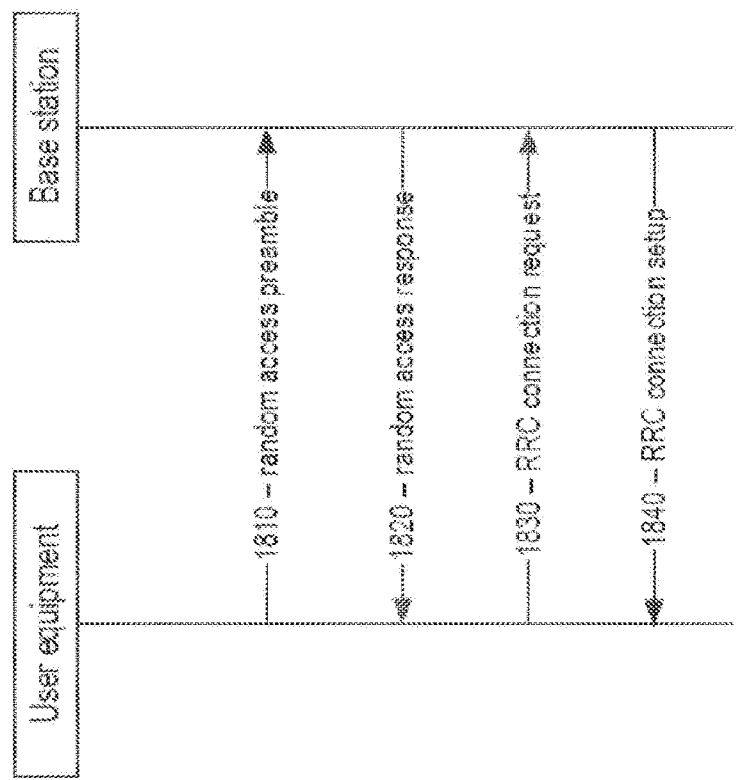
FIG. 18 is a message diagram illustrating an exemplary random access procedure.

FIG. 18 illustrates an exemplary random access procedure.

In step 1810, a UE (communication device) sends random access preamble (i.e., random access message) using the sequence and over the uplink time-frequency resources associated with the control resource set 1 that is selected from the candidate sets.

In step 1820, a BS (base station, scheduling device) detects a random access attempt, and then transmits a message over the downlink data channel, containing:
- the index of the random-access preamble sequences the network detected and for which the response is valid;
- the timing correction calculated by the random-access preamble receiver;
- a scheduling grant, indicating resources the terminal will use for the transmission in the step 1830; and
- a temporary identity, the TC-RNTI, used for the further communication between UE and the network.

Since each set 1 candidate has a distinct sequence (and/or associated uplink resources for sending preamble), the BS knows which set 1 the UE is selected after decoding the preamble sequence. Therefore, the DCI that indicates the resources carrying the above-mentioned message is transmitted in the set 1 selected by the UE.

The UE that has transmitted the preamble monitors the corresponding set 1 to receive the DCI and hence the message.

In step 1830, after step 1820, the uplink of the UE is time synchronized to the network. In step 1830, UE transmits its identifier to BS via normal uplink data channel and perform RRC connection request. (no modification compare to the LTE procedure)

In step 1840, the contention resolution is performed. If multiple UEs happen to select the same random-access resources (preamble sequences and the associated uplink resources), from the step 1820, these UEs performing simultaneous random-access attempts using the same preamble resources in the first step 1810 listen to the same response message in the second step 1820 and therefore have the same temporary identifier. Hence, in the fourth step 1840, each terminal receiving the downlink message will compare the identity in the message with the identity transmitted in the third step 1830. Only a terminal which observes a match between the identity received in the fourth step 1840 and the identity transmitted as part of the third step 1830 will declare the random-access procedure successful.

It is noted that the step 1840 of above exemplified random access procedure is similar to the LTE procedure except that the DCI that schedules the message in step 1840 is again transmitted in the set 1 that selected by the UE. It is further noted that the random access procedure described with reference to FIG. 18 is only exemplary. The present disclosure is not limited by this random access procedure and may also perform the random access in a different way. In general, any access which involves a randomly selected resource (by the random access message transmitter) may be applied.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
   a receiver, which, in operation,
      receives at least one entry, included in system information, out of a plurality of entries wherein each of the entries includes a candidate for configuration of a first control resource set; and
      determines, based on the at least one entry, a configuration of the first control resource set, wherein the configuration of the first control resource set includes parameters corresponding to a subcarrier spacing and a bandwidth of the first control resource set; and
   circuitry, which, in operation,
      monitors control resources in the first control resource set and receives within the first control resource set a configuration of a second control resource set; and
      monitors control resources in the first control resource set and/or in the second control resource set after receiving the configuration of the second control resource set.

2. The communication apparatus according to claim 1, wherein
the first control resource set is located within a first bandwidth and the second control resource set is located within a second bandwidth,
the first bandwidth is a bandwidth in which any resources allocated by control information carried in the first control resource set are located, and
the second bandwidth is a bandwidth in which any resources allocated by control information carried in the second control resource set are located.

3. The communication apparatus according to claim 2, wherein the first bandwidth and the second bandwidth are centered in a frequency domain.

4. The communication apparatus according to claim 2, wherein
the first bandwidth of the first control resource set is included in the second bandwidth of the second control resource set, or
the first control resource set is a subset of the second control resource set.

5. The communication apparatus according to claim 1, wherein
the first control resource set includes common control information to be decoded by a plurality of communication apparatuses as well as user specific control information to be decoded only by a specific communication apparatus, and
the second control resource set includes the user specific control information.

6. The communication apparatus according to claim 1, wherein the circuitry, in operation, monitors the first control resource set if the communication apparatus is in an operation mode facilitating power-saving.

7. The communication apparatus according to claim 1, wherein
the first control resource set is distributed in a frequency domain, and
the circuitry, in operation, performs frequency hopping every first predetermined time interval to monitor the first control resource set.

8. The communication apparatus according to claim 7, wherein
the second control resource set is distributed in the frequency domain,
the circuitry, in operation, performs frequency hopping every second predetermined time interval to monitor the second control resource set, and
the hopping pattern for the first control resource set is similar to the hopping pattern for the second control resource set.

9. The communication apparatus according to claim 7, wherein
the second control resource set is distributed in the frequency domain,
the circuitry, in operation, performs frequency hopping every second predetermined time interval to monitor the second control resource set, and
the hopping pattern for the first control resource set differs from the hopping pattern for the second control resource set at least in a frequency band in at least one time interval.

10. The communication apparatus according to claim 1, wherein
the circuitry, in operation, selects the configuration of the first control resource set according to the subcarrier spacing and the bandwidth of the first control resource set which is supported by the communication apparatus.

11. The communication apparatus according to claim 10, wherein
the parameters included in the configuration of the first control resource set further correspond to a bandwidth capability range of the communication apparatus, and
the circuitry, in operation, selects the configuration of the first control resource set according to the bandwidth capability range.

12. The communication apparatus according to claim 10, wherein the circuitry, in operation, in case the communication apparatus supports more than one configurations, performs selection of the configuration of the first control resource set as any of:
random selection of one of the supported configurations;
selection of a configuration with a default subcarrier spacing and a default bandwidth of the first control resource set;
selection based on an identifier of the communication apparatus; and
selection based on current channel conditions of the communication apparatus.

13. The communication apparatus according to claim 10, wherein the parameters included in the configuration of the first control resource set and/or parameters included in the configuration of the second control resource set include a hopping indication specifying whether or not a frequency hopping is applied to the corresponding control resource set.

14. The communication apparatus according to claim 13, wherein the parameters included in the configuration of the first control resource set and/or the parameters included in the configuration of the second control resource set include a hopping pattern indication when the hopping indication indicates that a frequency hopping is applied.

15. The communication apparatus according to claim 10, wherein
the configuration of the second control resource set includes a subset of the parameters included in the configuration of the first control resource set, and
the circuitry, in operation, applies the remaining parameters of the parameters included in the configuration of the first control resource set to the second control resource set.

16. The communication apparatus according to claim 1, wherein the circuitry, in operation,
monitors the first control resource set and/or the second control resource set, and
receives within the first control resource set and/or the second control resource set control information indicating a resource allocation for data transmission to the communication apparatus,
wherein the resource allocation indicates a numerology including the subcarrier spacing and a cyclic prefix length.

17. A method for a communication apparatus, comprising:
receiving at least one entry, included in system information, out of a plurality of entries wherein each of the entries includes a candidate for configuration of a first control resource set;
determining, based on the at least one entry, a configuration of the first control resource set, wherein the configuration of the first control resource set includes parameters corresponding to a subcarrier spacing and a bandwidth of the first control resource set;

monitoring control resources in the first control resource set;

receiving within the first control resource set an indication of a configuration of a second control resource set; and monitoring control resources in the first control resource set and/or in the second control resource set after receiving the configuration of the second control resource set.

18. The method according to claim 17, wherein the first control resource set is located within a first bandwidth and the second control resource set is located within a second bandwidth, the first bandwidth is a bandwidth in which any resources allocated by control information carried in the first control resource set are located, and the second bandwidth is a bandwidth in which any resources allocated by control information carried in the second control resource set are located.

19. The method according to claim 18, wherein the first bandwidth and the second bandwidth are centered in the frequency domain.

20. The method according to claim 18, wherein the first bandwidth of the first control resource set is included in the second bandwidth of the second control resource set, or the first control resource set is a subset of the second control resource set.

* * * * *